US011374644B2

(12) United States Patent
Pan et al.

(10) Patent No.: US 11,374,644 B2
(45) Date of Patent: Jun. 28, 2022

(54) GROUP-BASED BEAM MANAGEMENT

(71) Applicant: IDAC HOLDINGS, INC., Wilmington, DE (US)

(72) Inventors: Kyle Jung-Lin Pan, Saint James, NY (US); Fengjun Xi, San Diego, CA (US); Afshin Haghighat, Ile-Bizard (CA); Oghenekome Oteri, San Diego, CA (US); Chunxuan Ye, San Diego, CA (US); Frank La Sita, Setauket, NY (US); Robert L. Olesen, Huntington, NY (US); Moon-il Lee, Melville, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/953,469

(22) Filed: Nov. 20, 2020

(65) Prior Publication Data

US 2021/0152233 A1 May 20, 2021

Related U.S. Application Data

(63) Continuation of application No. 16/347,065, filed as application No. PCT/US2017/059806 on Nov. 2, 2017, now Pat. No. 10,848,232.

(Continued)

(51) Int. Cl.
*H04B 7/08* (2006.01)
*H04B 17/327* (2015.01)
(Continued)

(52) U.S. Cl.
CPC ........... *H04B 7/088* (2013.01); *H04B 7/0691* (2013.01); *H04B 7/0695* (2013.01);
(Continued)

(58) Field of Classification Search
CPC .... H04B 7/088; H04B 17/327; H04B 7/0691; H04B 7/0695; H04B 7/0857;
(Continued)

(56) References Cited

U.S. PATENT DOCUMENTS

2013/0286959 A1  10/2013  Lou et al.
2015/0257073 A1   9/2015  Park et al.
(Continued)

FOREIGN PATENT DOCUMENTS

WO       2011/150549 A1     12/2011

OTHER PUBLICATIONS

3rd Generation Partnership Project (3GPP), R1-1608665, "Beam Grouping for Beam Management", ZTE, ZTE Microelectronics, 3GPP TSG RAN WG1 Meeting #86bis, Lisbon, Portugal, Oct. 10-14, 2016, 5 pages.

(Continued)

*Primary Examiner* — Fitwi Y Hailegiorgis
(74) *Attorney, Agent, or Firm* — Jamie T. Nguyen

(57) ABSTRACT

A WTRU may include a memory and a processor. The processor may be configured to receive beam grouping information from a gNB or transmission and reception point (TRP). The beam grouping information may indicate a group of beams that the WTRU may report using group-based reporting. The group-based reporting may be a reduced level of reporting compared to a beam-based reporting. The group-based report may include measurement information for a representative beam. The representative beam may be one of the beams in the group or represents an average of the beams in the group. Alternatively, the representative beam may be a beam that has a maximum measurement value compared to other beams in the group. The group-based report may include a reference signal received (Continued)

power (RSRP) for the representative beam and a differential RSRP for each additional beam in the beam group.

16 Claims, 28 Drawing Sheets

Related U.S. Application Data

(60) Provisional application No. 62/542,950, filed on Aug. 9, 2017, provisional application No. 62/519,621, filed on Jun. 14, 2017, provisional application No. 62/500,792, filed on May 3, 2017, provisional application No. 62/443,288, filed on Jan. 6, 2017, provisional application No. 62/416,674, filed on Nov. 2, 2016.

(51) Int. Cl.
*H04B 7/06* (2006.01)
*H04W 24/10* (2009.01)
*H04B 7/0452* (2017.01)

(52) U.S. Cl.
CPC ......... *H04B 7/0857* (2013.01); *H04B 7/0874* (2013.01); *H04B 7/0882* (2013.01); *H04B 17/327* (2015.01); *H04W 24/10* (2013.01); *H04B 7/0452* (2013.01)

(58) Field of Classification Search
CPC .. H04B 7/0874; H04B 7/0882; H04B 7/0452; H04W 24/10
USPC ........................................................ 375/267
See application file for complete search history.

(56) References Cited

U.S. PATENT DOCUMENTS

| | | |
|---|---|---|
| 2016/0127994 A1 | 5/2016 | Cho et al. |
| 2017/0347389 A1* | 11/2017 | Cho ................. H04W 52/0225 |
| 2018/0035396 A1* | 2/2018 | Stirling-Gallacher ...................... H04H 20/16 |
| 2019/0215896 A1 | 7/2019 | Zhou et al. |
| 2019/0254110 A1 | 8/2019 | He et al. |

OTHER PUBLICATIONS

3rd Generation Partnership Project (3GPP), R1-1706660, "WF on Beam Reporting", CATT, Intel, 3GPP TSG RAN WG1 #88bis, Spokane, USA, Apr. 3-7, 2017, 2 pages.

3rd Generation Partnership Project (3GPP), TR 38.913 V14.3.0, "Technical Specification Group Radio Access Network, Study on Scenarios and Requirements for Next Generation Access Technologies, (Release 14)", Jun. 2017, pp. 1-39.

Alkhateeb et al., "MIMO Precoding and Combining Solutions for Millimeter-Wave Systems", IEEE Communications Magazine, vol. 52, No. 12, Dec. 2014, pp. 122-131.

* cited by examiner

Group 1  Group 2

GROUP-BASED BEAM MANAGEMENT

CROSS-REFERENCE TO RELATED APPLICATIONS

This application is a continuation of U.S. Non-Provisional application Ser. No. 16/347,065, filed May 2, 2019, which is the National Stage entry under 35 U.S.C. § 371 of Patent Cooperation Treaty Application PCT/US2017/059806, filed Nov. 2, 2017, which claims the benefit of U.S. Provisional Patent Application No. 62/416,674, filed Nov. 2, 2016, U.S. Provisional Patent Application No. 62/443,288, filed Jan. 6, 2017, U.S. Provisional Patent Application No. 62/500,792, filed May 3, 2017, U.S. Provisional Patent Application No. 62/519,621, filed Jun. 14, 2017, U.S. Provisional Patent Application No. 62/542,950, filed Aug. 9, 2017, the contents of which are incorporated by reference.

BACKGROUND

In next generation mobile communications, applications such as enhanced mobile broadband (eMBB), massive Machine Type Communications (mMTC) and Ultra-Reliable Low Latency Communications (URLLC) may be deployed. A wide range of spectrum bands ranging from 700 MHz to 80 GHz may be used in a variety of deployment scenarios. These may include both licensed and unlicensed spectrum.

Multiple antenna transmission and beam forming may be used. For sub-6 GHz transmission, multiple antenna techniques such as Multiple Input Multiple Output (MIMO) transmission and its different flavors, e.g., Single Input Multiple Output (SIMO) and Multiple Input Single Output (M ISO) techniques may be used. Different MIMO techniques may deliver different benefits such as providing diversity gain, multiplexing gain, beamforming, array gain, etc. In the cellular communication, where UTs may communicate to a single central node, the use of MU-MIMO may increase the system throughput by facilitating the transmission of multiple data streams to different UTs at the same time on the same and/or overlapping set of resources in time and/or frequency. In the SU-MIMO case, the same central node may transmit multiple data streams to the same UT.

SUMMARY

One or more example embodiments as described more fully below provide apparatuses, functions, procedures, processes, execution of computer program instruction tangibly embodying a computer readable memory, functions and operation of methods for one or more of the following. Systems, methods, and instrumentalities may be provided for beam grouping, group-based beam management, signalling group-based beam indication, group-based beam reporting, group-based beam tracking and/or pairing and waveform selection for beam management.

For example, multiple transmission or receiving beams may be grouped into a beam group. The grouping may be based on one or more of spatial correlation measurement, a pre-defined rule and/or procedure, or a beamwidth of the transmission beams. When a transmission and reception point (TRP) creates the beam group(s), an indication of the grouping to a wireless transmit/receive unit (WTRU). The WTRU may perform per beam and/or per-beam group based measurements, and send the measurements to the TRP. Upon receiving the measurements, the TRP may update the beam grouping based on the measurements.

The WTRU may include a memory and a processor. The processor may be configured to receive beam grouping information from a transmission and reception point (TRP). The beam grouping information may indicate a group of beams that the WTRU may report using group-based reporting. The group-based reporting may be a reduced level of reporting compared to a beam-based reporting. The group-based report may include measurement information for a representative beam. The representative beam may be one of the beams in the group or represents an average of the beams in the group. For example, the representative beam may be a beam that has a maximum measurement value compared to other beams in the group. The group-based report may include a reference signal received power (RSRP) for the representative beam and a differential RSRP for a different beam in the beam group.

The beam-based report may include measurement information for individual beams. The group-based report may have less information about individual beams than the beam-based report.

The WTRU may send, to the TRP, a group-based report during a short cycle and a beam-based report during a long cycle. The WTRU may send, to the TRP, the group-based report, via uplink (UL) signaling periodically or aperiodically. When the group-based report is sent periodically, it is sent using NR-physical control uplink channel (PUCCH). When the group-based report is sent aperiodically, it is sent using NR-physical uplink shared data channel (PUSCH). The processor may be configured to send the group-based report more often than the beam-based report.

DETAILED DESCRIPTION

Figure 1A:
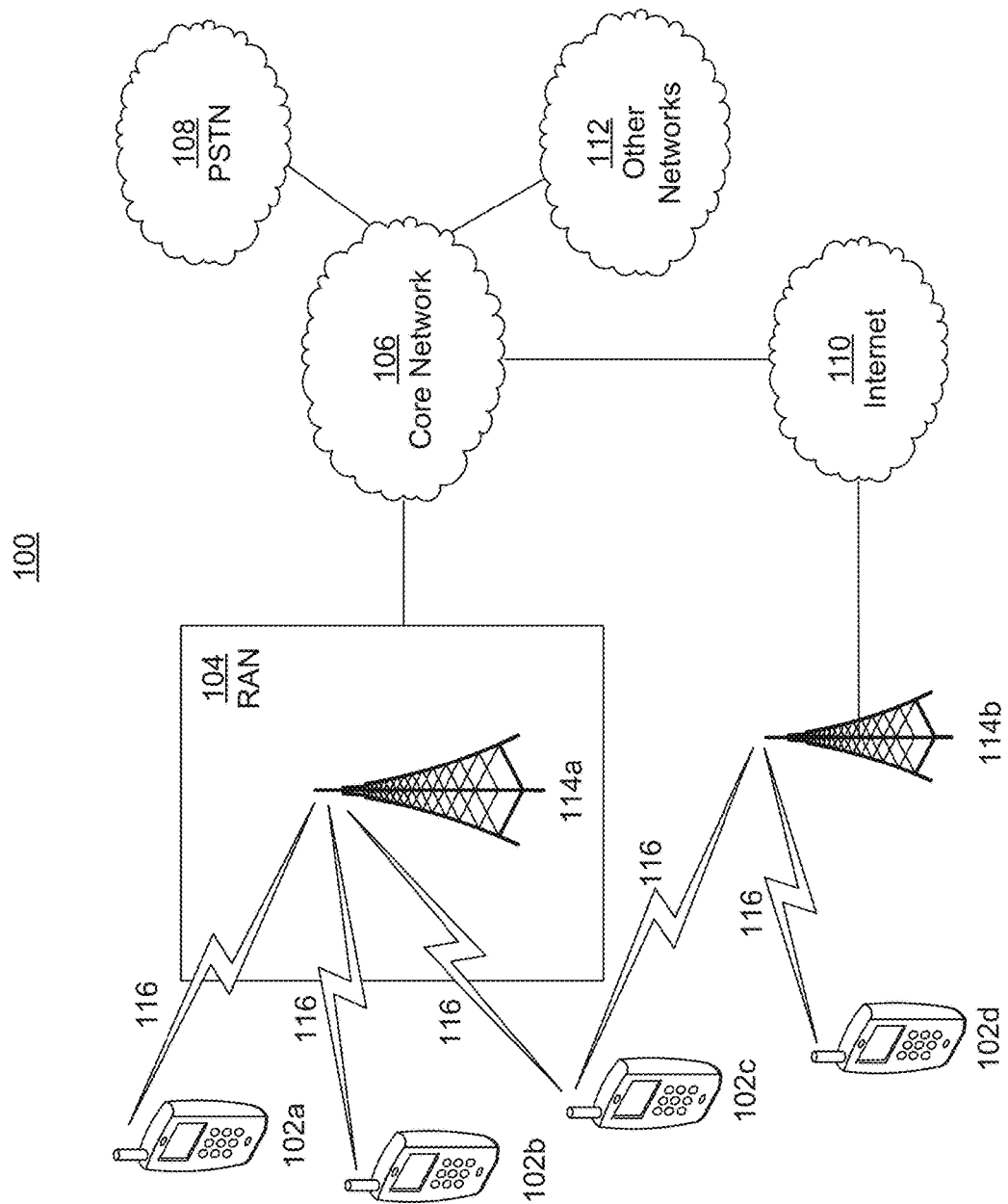
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
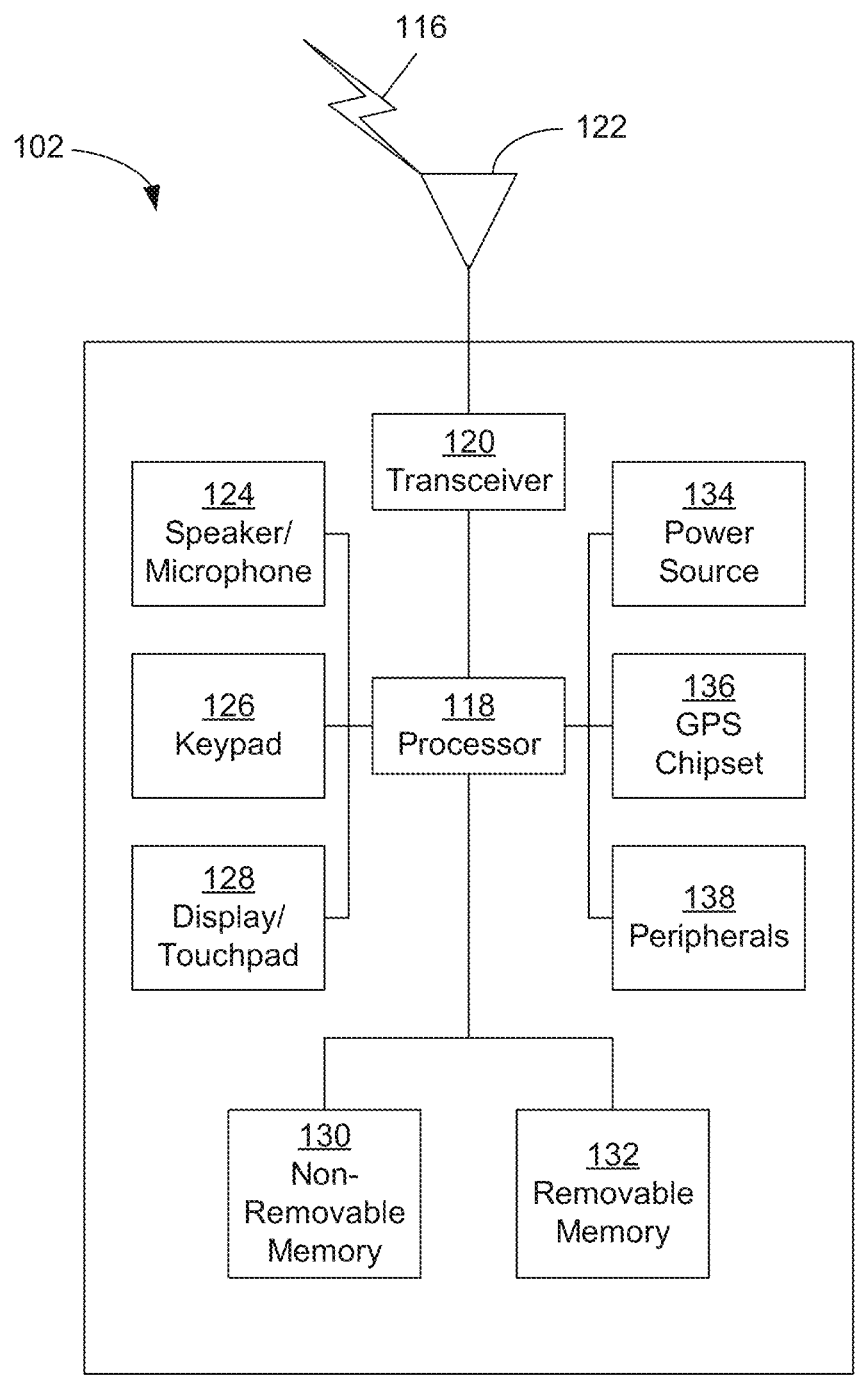
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
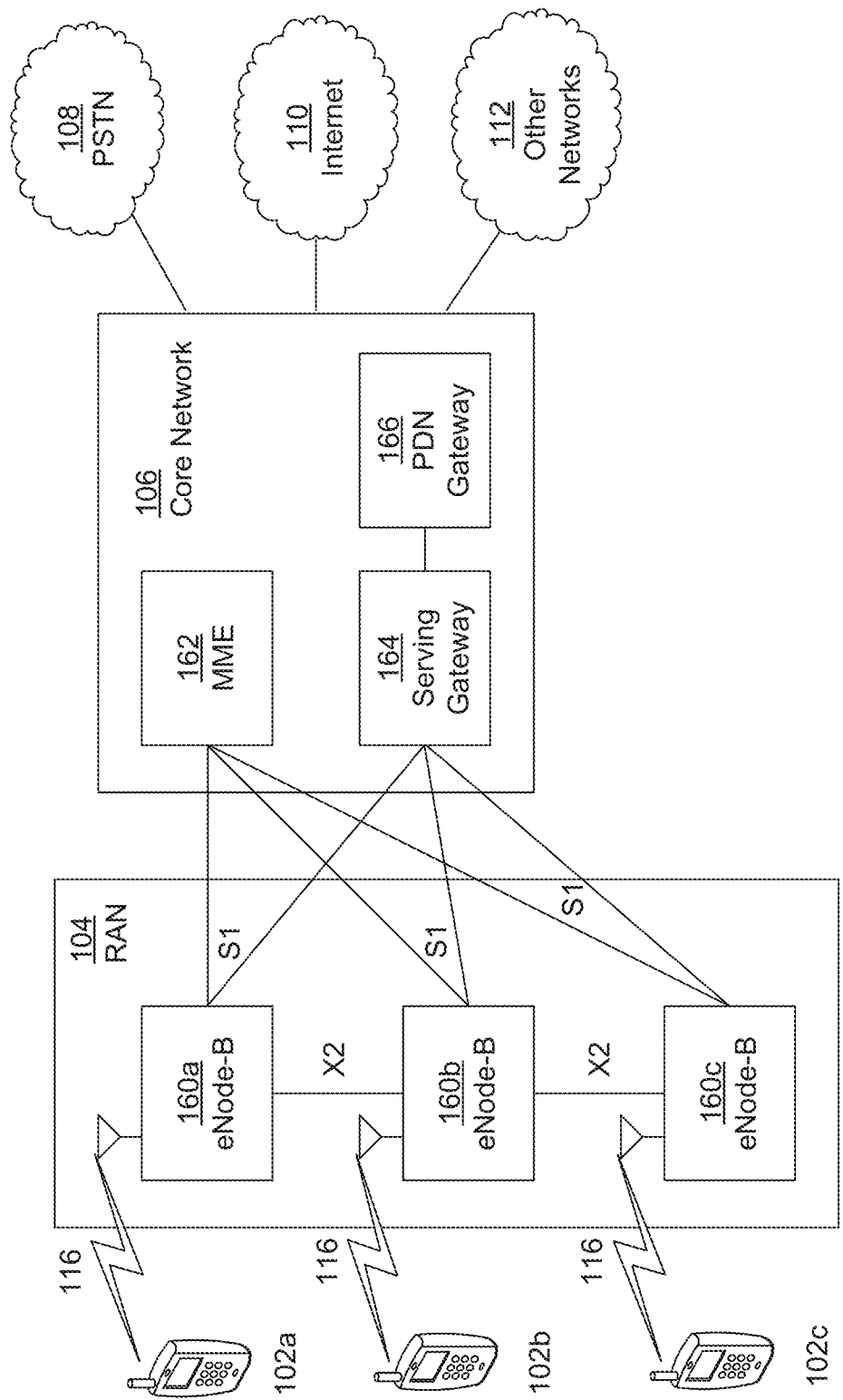
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
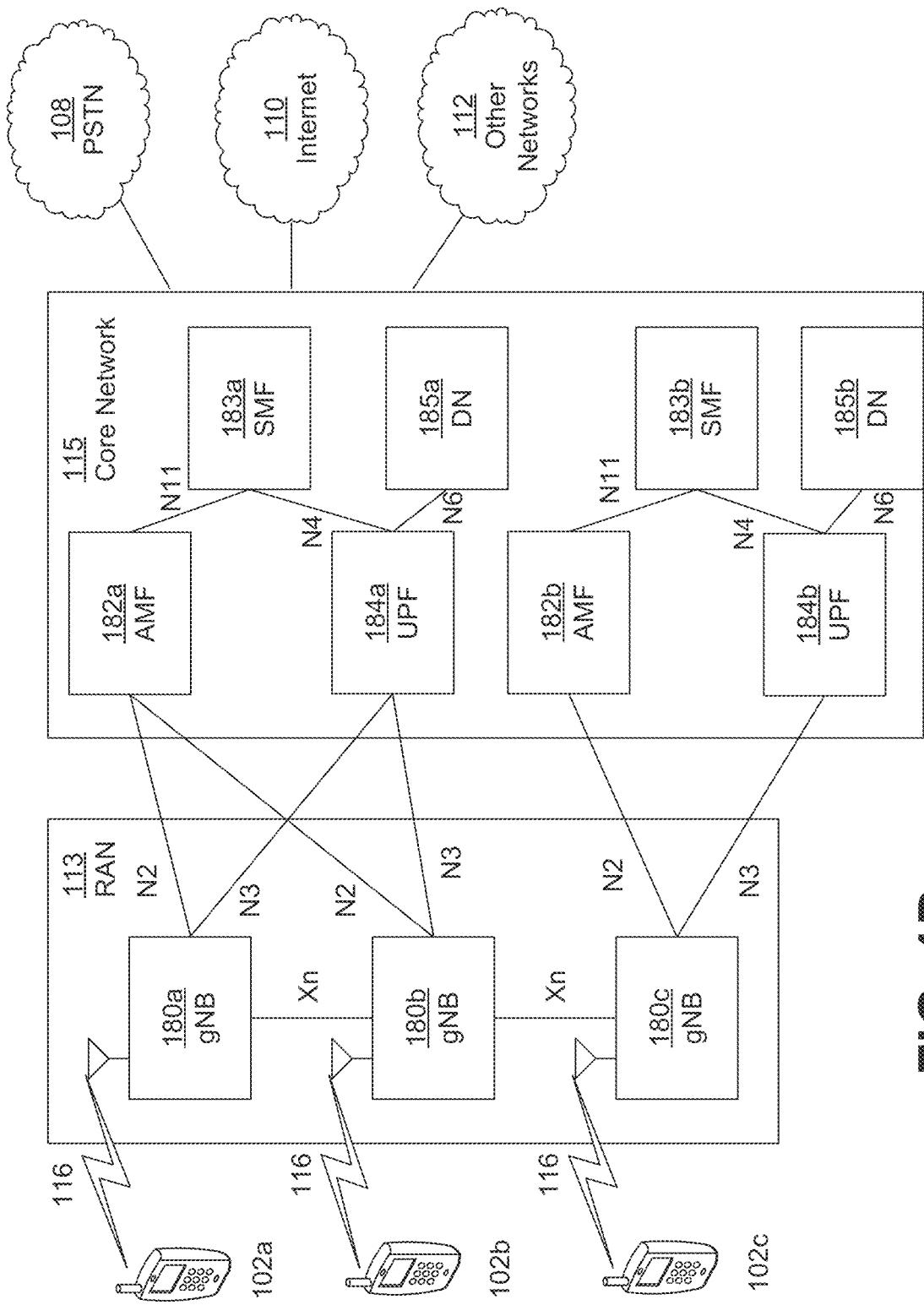
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may include a memory and a processor. The processor may be configured to receive beam grouping information from a gNB or transmission and reception point (TRP). The beam grouping information may indicate a group of beams that the WTRU may report using group-based reporting. The group-based reporting may be a reduced level of reporting compared to a beam-based reporting. The group-based report may include measurement information for a representative beam. The representative beam may be one of the beams in the group or represents an average of the beams in the group. Alternatively, the representative beam may be a beam that has a maximum measurement value compared to other beams in the group. The group-based report may include a reference signal received power (RSRP) for the representative beam and a differential RSRP for each additional beamin the beam group.

The beam-based report may include measurement information for individual beams. The group-based report may have less information about individual beams than the beam-based report.

The WTRU may send, to the TRP, a group-based report during a short cycle and a beam-based report during a long cycle. The WTRU may send, to the TRP, the group-based report, via uplink (UL) signaling periodically or aperiodically. When the group-based report is sent periodically, it is sent using NR-physical control uplink channel (PUCCH). When the group-based report is sent aperiodically, it is sent using NR-physical uplink shared data channel (PUSCH). The processor may be configured to send the group-based report more often than the beam-based report.

Multiple antenna transmission at millimeter wave frequencies may differ slightly from sub-6 GHz multiple antenna techniques. This may be due to the different propagation characteristics at millimeter wave frequencies and the possibility of the BTS/UE having a limited number of RF chains compared with antenna elements.

Figure 2:
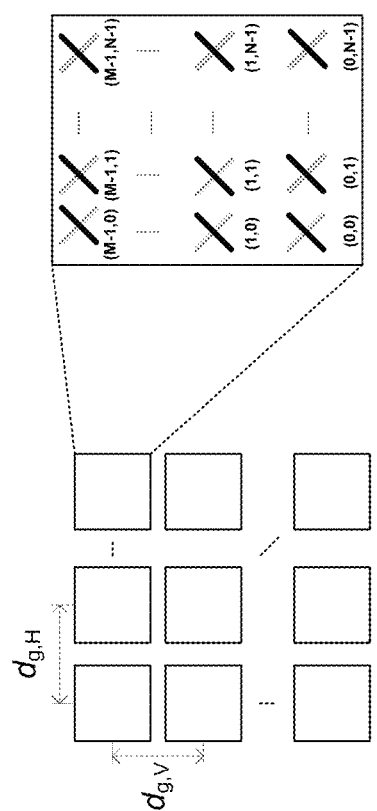
FIG. 2 depicts an example Transmission/Reception Points (TRP) and a WTRU antenna model.

The massive antenna model may be configured as Mg antenna panels per vertical dimension and Ng antenna panels per horizontal dimension, wherein a antenna panel may be configured with N column and M row of antenna element with or without polarization as shown in the FIG. 2. The timing and phase may be not calibrated across panels although multiple panels may be equipped in the same eNB. The baseline massive antenna configuration may be different according to the operating frequency band as listed in TABLE 1.

TABLE 1

| Baseline massive antenna configuration for dense urban and urban macro | | |
|---|---|---|
| At 4 GHz | At 30 GHz | At 70 GHz |
| Dense urban and urban macro: (M, N, P, Mg, Ng) = (8, 8, 2, 1, 1), (dV, dH) = (0.8, 0.5)λ | Dense urban and urban macro: (M, N, P, Mg, Ng) = (4, 8, 2, 2, 2), $(d_V, d_H)$ = (0.5, 0.5)λ, $(d_{g,V}, d_{g,H})$ = (2.0, 4.0)λ | Dense urban: Baseline: (M, N, P, Mg, Ng) = (8, 16, 2, 2, 2), $(d_V, d_H)$ = (0.5, 0.5)λ, $(d_{g,V}, d_{g,H})$ = (4.0, 8.0) λ |
| A single panel | 4 panels | 4 panels |
| 64 elements per Pol. | 32 elements per Pol. | 128 elements per Pol. |
| Total 128 elements | Total 256 elements | Total 1024 elements |

Precoding at millimeter wave frequencies may be digital, analog or a hybrid of digital and analog. Digital precoding may be precise and can be combined with equalization. It may enable single user (SU), multi-user (MU) and multi-cell precoding and may be similar to that used in sub 6 GHz, for example in IEEE 802.11n and beyond and in 3GPP LTE and beyond. In millimeter wave frequencies, the presence of a limited number of RF chains compared with antenna elements and the sparse nature of the channel may complicate the use of digital beamforming. Analog beamforming may overcome the limited number of RF chains issue by using analog phase shifters on each antenna element. It may be used in IEEE 802.11ad during the sector level sweep (which may identify the best sector), beam refinement (which may refine the sector to an antenna beam) and beam tracking (which may adjust the sub-beams over time to take into account any change in the channel) procedures.

In hybrid beamforming, the precoder may be divided between analog and digital domains. A domain may have precoding and combining matrices with different structural constraints e.g., constant modulus constraint for combining matrices in the analog domain. This design may result in a compromise between hardware complexity and system performance. Hybrid beamforming may be able to achieve digital precoding performance due to sparse nature of channel and support multi-user/multi-stream multiplexing. It may be limited by number of RF chains. The mmWave channels may be sparse in the angular domain.

Beam management for new radio may be performed. The use of higher band frequencies may imply that their propagation characteristics may influence the system design. As frequencies increase, the channel may experience higher path losses and more abrupt changes. In high frequency bands, large-scale antenna array could be used to achieve high beamforming gain so as to compensate the high propagation loss. The resulting coupling loss could be kept at high level to support the desired data throughput or coverage. The use of directional beam based communication may be associated with accurate beam pairing, and the correct beam direction may be associated with real channel, in terms of angle of arrival and angle of departure in both azimuth and elevation. The correct beam direction may be dynamically adjusted with the channel change.

Beam management may be performed on a per beam basis (or beam-by-beam basis). To reduce signalling/feedback overhead and allow certain flexibility of using beams for transmission/reception, group-based beam indication may be performed. Beam management may be performed on a group basis. Beam grouping can be performed at the TRP side and/or at the UE side. Group-based beam maintenance can be performed such that beam tracking/refinement within a group or multiple groups can be supported in more transparent manner. Group-based beam switching can be supported when multiple beam groups are maintained in order to improve the robustness against unexpected channel blockage. Beam grouping may include, TRP(s) or UE may group multiple Tx and/or Rx beam(s) and/or beam pair(s) into one subset of beams. Beam grouping, reporting, beam-group based indication for beam measurement, beam-based transmission and/or beam switching may be performed.

Beams may be grouped. The group-based beam capability may be communicated. Beam-group based indication may be signalled. The WTRU may perform group-based beam measurement and reporting. Group-based beam sweeping, pairing and tracking may be performed. Waveform selection for beam management may be performed. NR may support DFT-S-OFDM based waveform complementary to CP-OFDM waveform, e.g., for eMBB uplink for up to 40 GHz. Low PAPR techniques may be employed. CP-OFDM waveform can be used for a single-stream and multi-stream (e.g., MIMO) transmissions. DFT-S-OFDM based waveform may be limited to a single stream transmissions (targeting for link budget limited cases). Network may determine and communicate to the UE which one of CP-OFDM and DFT-S-OFDM based waveforms to use. CP-OFDM and DFT-s-OFDM based waveforms may be used for UE uplink. The network may determine and communicate to the UE which waveforms to use for beam management.

The term gNB or eNB may be interchangeably used with transmission and reception point (TRP) hereon. A TRP may have one or multiple beams. A WTRU may have one or multiple beams. Beam management with one TRP may be named as intra-TRP beam management, while beam management with multiple TRPs may be named as inter-TRP beam management.

A WTRU's capability of performing a group-based beam operation may be indicated via an information element (IE). For example, whether the WTRU is capable of performing single beam operations on per-beam basis, and/or whether the UE is capable of performing group-based beam operations may be indicated in the WTRU's capability IE. The WTRU's capability may be summarized in the WTRU's beam capability IE. An example of beam capability IE is shown in ENUMERATED {beam, group-based beam, both, none, spare}, where "beam" may indicate that a WTRU supports single beam operations on per-beam basis including one or more of beam sweeping, beam reporting, or the like; "group-based beam" may indicate that the WTRU supports group-based beam operations (e.g., one or more of the group-based beam operations as discussed herein); "both" may indicate that the WTRU supports both single-beam based operations and group-beam based operations; "none" may indicate that the WTRU does not support beam-based operations; "spare" may be reserved for future usage.

Group-based beam management (BM) for multiple TRPs may be performed using one or more of transparent global group-based BM management, non-transparent localized group-based BM management, or beam and/or WTRU grouping. For example, transparent global group-based BM management may be used for multi-TRP. Which TRP a beam group is for may be transparent to the WTRU. A beam group(s) may be formed from a same beam set that includes beams (e.g., all beams) from TRPs (e.g., all TRPs), for example, based on one or more of the criterion defined herein. Which TRP a beam within a beam group is for or associated with may not be required to be indicated (e.g., signaled) to the WTRU.

Non-transparent localized group-based BM may be used for multi-TRP. Which TRP a beam within a beam group is for or associated with may not be transparent to the WTRU. A beam group may be formed from different beam sets from different TRPs, for example, based on any of the criterion defined herein. Which TRP a beam within the beam group is associated with may be indicated (e.g., signaled) to the WTRU.

Group-based BM may be used and/or configured for a group of WTRUs. Group-based BM may be transparent or non-transparent. A beam group may be associated with a specific set of WTRUs. A signal may be sent (e.g., implicitly sent) to a set of WTRUs to switch to a specific beam configuration. For example, this may configure and/or indicate a beam-group for a specific WTRU group which may include one or more WTRUs.

In an example of group-based beam management for multiple TRPs, two TRPs may be associated (e.g., connected) with one WTRU. TRP1 may have one beam set with 6 Tx beams while TRP2 may have a beam set with 4 Tx beams. Beam group 1 may be formed with TRP1 Tx beam 5 and TRP2 Tx beam 1; beam group 2 may be formed with TRP1 Tx beam 2 and TRP1 Tx beam 3.

When transparent global group-based BM management is performed, the beams from the TRPs may form a beam set $\{1, 2, 3, 4, 5, 6, 7, 8, 9, 10\}$. If the beams from TRP1 and TRP2 are indexed in an ascending order, beam group 1 and 2 may be defined or signaled as $\{5, 7\}$ and $\{2, 9\}$ respectively.

When non-transparent localized group-based BM management is performed, the beams from different TRPs may form 2 beam set: TRP1 beam set $\{1, 2, 3, 4, 5, 6\}$ and TRP2 beam set $\{1, 2, 3, 4\}$. Beam groups 1 and 2 may be defined or signaled as $\{TRP1.5, TRP2.1\}$ and $\{TRP1.2, TRP2.3\}$ respectively.

When transparent global group-based BM management is used with beam and WTRU grouping, beam groups 1 and 2 may be defined or signaled as $\{5,7, \{UE1, UE3\}\}$ and $\{2,9, \{UE5, UE7\}\}$ respectively. When non-transparent global group-based BM management is performed, and beam and WTRU grouping is performed, beam groups 1 and 2 may be defined or signaled as $\{TRP1.5, TRP2.1, \{UE1 UE3\}\}$ and $\{TRP1.2, TRP2.3, \{UE5, UE7\}\}$ respectively.

Beams may be grouped based on various techniques. For example, beam groups may be defined based on one or a combination of the following criterion.

Beam groups may be defined based on channel properties. TRP(s) or WTRU(s) may group multiple Tx/Rx beam(s) or beam pair(s) into one subset of beams sharing similar channel properties and/or physical antenna array properties. Beam grouping may be performed on Tx beams, Rx beams and/or Tx-Rx beam pairs or beam pair links (BPLs) sharing similar channel properties, such as angles of arrival (AoA) and/or angles of departure (AoD), QCL, TA, polarization, or WTRU capability such as array or sub-array properties (e.g., WTRU front or back panel).

Spatial correlation measurement may be used to perform beam grouping. TX beams (e.g., from an array or a sub-array) with spatial correlation measurement that is greater or less than a pre-defined threshold may be grouped into a same beam group. Beams with high spatial correlation may have similar AoD and/or polarization values, which may indicate high spatial correlation between the beams and/or that the beams are spatially close to each other. AoD and/or polarization may be used as a metric to measure spatial correlation. One or more baseline AoDs may be selected. The beams that have AoD difference less than a threshold from one of the baseline AoD may be grouped into a Tx beam group with one polarization. Rx beams with spatial correlation measurement greater than a pre-defined threshold may be grouped into a beam group. AoA and/or polarization may be used as a metric to measure the spatial correlation. One or more baseline AoAs may be selected. The beams that have AoA difference less than a threshold to one of the baseline AoA may be grouped into one Rx beam group with one polarization. A beam pair link (BPL) may be based on joint AoDs/AoAs or spatial correlation measurements at both TX and RX.

A beam group may be defined and/or created based on a pre-defined rule and/or procedure. The pre-defined rule may include parameters that includes a MIMO transmission type. A definition of the MIMO transmission type may support one or more of: multiple WTRUs and/or multiple TRPs communicating over a same set of sub-band frequencies (e.g., sub-carriers, or resources). Multiple WTRUs and/or multiple TRPs communicating over a same set of sub-band frequencies may also be referred to as MU-MIMO or multi-user MIMO. MU-MIMO or multi-user MIMO may include one or more of the following: a single TRP to multiple WTRUs, transmission form multiple WTRUs to a single TRP, transmission from multiple TRPs to a single WTRU, and/or transmission from multiple TRPs to multiple WTRUs. The pre-defined rule may depend on transmission requirements and or capabilities including one or more of initial access, re-association, handover, a MIMO transmission capability, a use case (e.g., including one or more of eMBB, mMTC, URLLC, or the like), or a service type (e.g., including one or more of video, VoIP, gaming, or the like).

A definition of beam groups may be implemented using approaches herein. Beam groups may be defined using a similar link budget for cell center and/or a cell edge. Beam groups may be defined using mobility rules that may recommend a wide beamwidth to support a high mobility and/or a broader coverage. Beam groups may be defined by a common spatial region, using a sector defined in one or more of azimuth, elevation, an antenna array or sub-array, or polarization.

The beam group may be defined based on the beamwidth of the beam by a WTRU or TRP enabling grouping a set of beams. For example, a WTRU or TRP that is undergoing a beam-sweep procedure may decide to group a set of transmit or receive beams. For example, an L1/L2 beam management procedure may sweep through a series of beamwidths to identify a refined beam (e.g., the best refined beam). The WTRU may identify a set of desired beams within a (e.g., each) beamwidth as a single group by feeding back details of the beams and/or a beam group ID. The beam group ID may be unique.

Figure 3A:
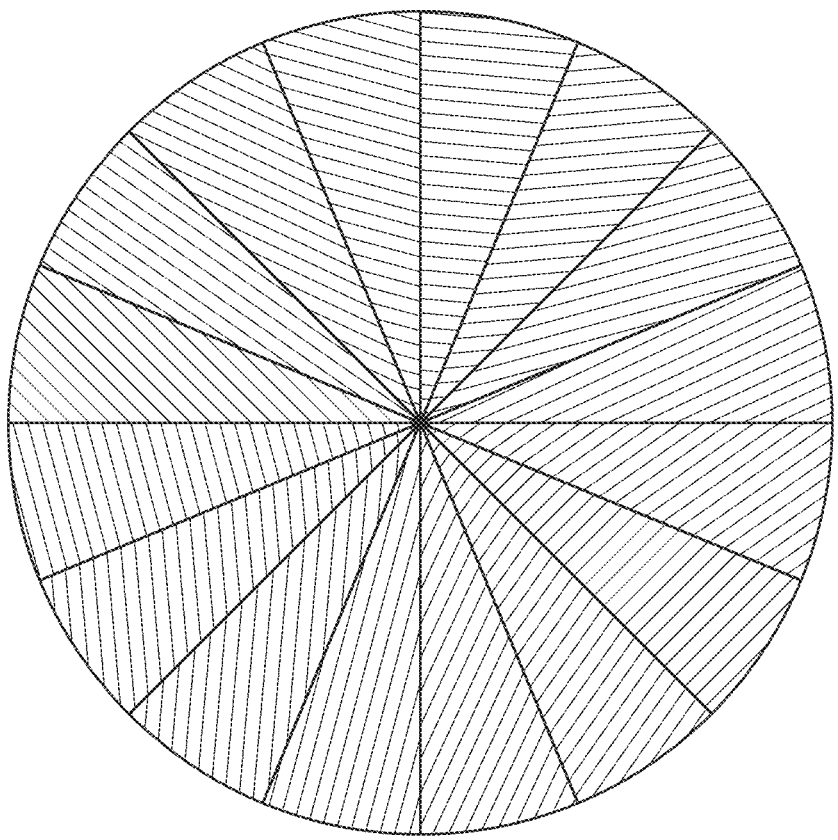
FIG. 3A depicts two example groups of beams with different equal beamwidths.
Figure 3A:
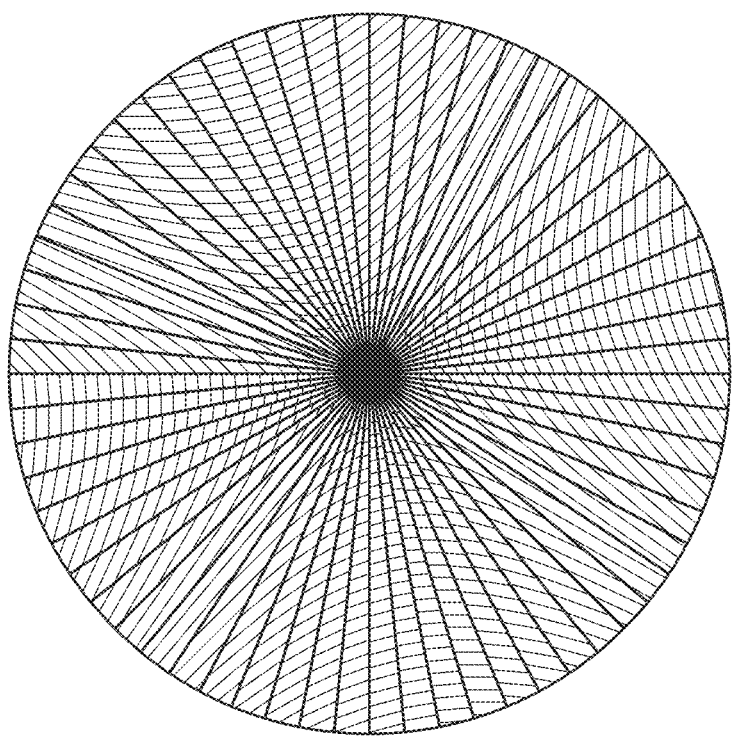

A set of beams with equal beam widths that span the beam subspace may be identified as a group. FIG. 3A illustrates a set of beams having equal beam widths that span the beam subspace as a group. A set of beams that span a portion of the beamspace with unequal beamwidths may be identified.

Figure 3B:
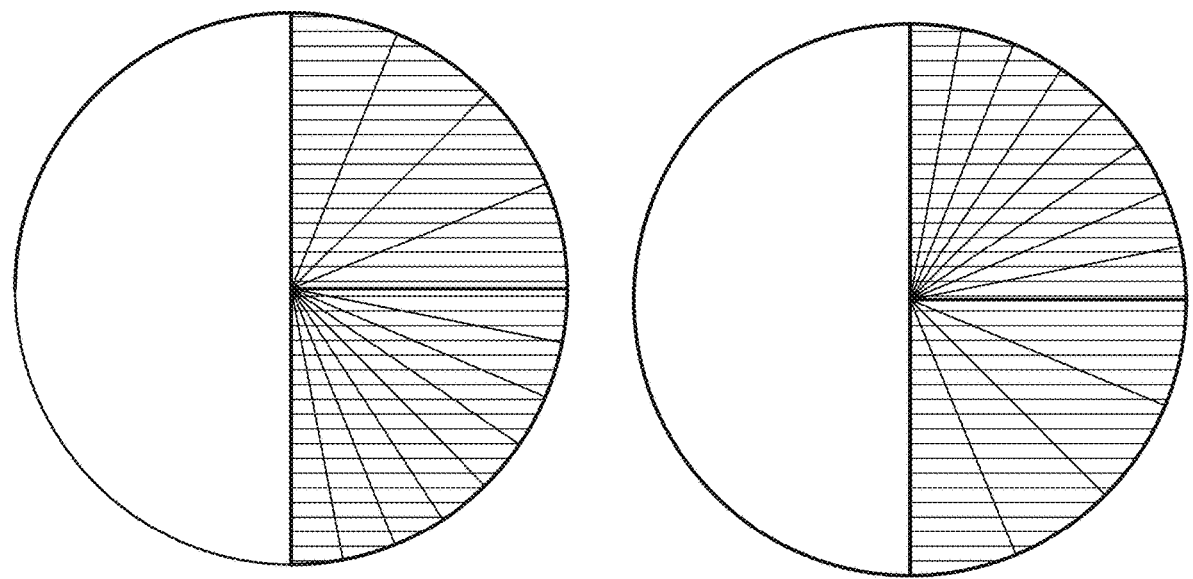
FIG. 3B depicts two example groups of beams with unequal beamwidths that may be used in scenarios with unequal distribution of WTRUs within the TRP.

FIG. 3B illustrates a set of beams that span a portion of the beamspace with unequal beamwidths. Grouping in this manner (e.g., grouping in the manner shown in FIG. 3A and FIG. 3B) may facilitate an L1/L2 beam management procedure to identify the best transmit/receive beams for transmission. In multi-beam transmission, sub-beam grouping within a sweep group may be used to identify sub-groups that may transmit simultaneously for more efficient beam sweeping.

Beam groups may be determined, indicated, and/or configured. One or more beam groups may be determined and used at a WTRU receiver (Rx), for example, based on one or more of the criterion herein. A beam group may be determined based on one or more of the following. One or more Rx beams which may be formed or received simultaneously may form a beam group. The maximum number of beam groups may be referred to as M. The maximum number of Tx beams reported for a beam group may be referred to as N. The number of beam groups to report at a time may be referred to as L. The number of Tx beams reported for a beam group at a time may be referred to as Q. M and/or N may be indicated by WTRU capability IE. L and/or Q may be configured by, for example, one or more of RRC message, MAC-CE, or DCI control signaling.

A WTRU may report or indicate the number of beam groups supported at the WTRU. A WTRU may report or indicate the maximum number of beam groups M' (for example, M'≤M), and the WTRU's associated beam group information. A WTRU may request M' beam groups' sounding reference signal (SRS) resources to provide information of beam groups when a WTRU has beam correspondence capability. For example, each SRS resource may be used to transmit Tx beams which may correspond to RX beams in an associated beam group. A gNB may receive or pair the RX beams based on each SRS resource(s) (e.g., beam group), and the gNB may determine Tx beams for each Rx beam group.

A WTRU may report or indicate beam group information (e.g., each beam group information) based on a set of CSI-RS resource indices. A first beam group may be associated with a first set of CSI-RS resources and a second beam group may be associated with a second set of CSI-RS resources. A gNB may indicate a beam group for a downlink transmission, and a WTRU may determine Rx beam group for downlink reception based on the indication. A WTRU may autonomously determine the beam groups and/or indicate (e.g., only indicate) the number of beam groups used or supported at the WTRU.

A WTRU may report some Tx beams for each of a certain number of beam groups. A WTRU may report Q Tx beams for each of L beam groups, wherein Q and L may be determined based on one or more of the following. If L=1, a WTRU may determine a beam group which may provide at least one of a highest SNR, a highest throughput performance, a highest CQI, or a highest RSRP among the beam groups supported at the WTRU. A WTRU may determine a beam group which may be indicated in the DCI. The DCI may be used to trigger the Tx beams reporting. A WTRU may determine a beam group which may be associated with a specific antenna group (for example, a panel associated with the TRP). The beam group index may be reported when the associated Q Tx beams are reported. Q Tx beams which may be determined for the determined beam group may be reported.

If L>1, a WTRU may determine L beam groups which may provide at least one of the highest L SNRs, the highest L throughput performances, the highest L CQIs, or the highest L RSRP among the beam groups supported at the WTRU. A WTRU may determine L beam groups which may be associated with a specific antenna group (for example, a panel associated with the TRP). For example, the best L beam groups may be reported and/or Q Tx beams for each of the best L beam groups may be reported. Q may be different based on the beam group. For example, Q(I) may be reported, where I may be a beam group index.

L may be determined based on at least one of the following: the WTRU capability (for example, M'), the transmission mode, the uplink channel used for Tx beam reporting (for example, L=1 may be used if PUCCH is used for the beam reporting and L>1 may be used if PUSCH is used for the TX beam reporting), the reporting periodicity (for example, L=1 may be used for periodic or semi-persistent Tx beam reporting and L>1 may be used for aperiodic beam reporting), or one or more of the number of CSI report settings configured, the number of resource settings configured, and the number link. L may be configured via higher layer signalling.

The Q for a beam group may be determined based on at least one of the following. The Tx beams for a beam group may be determined or selected by a WTRU based on QCL status. For example, a WTRU may determine Tx beams for a beam group among the Tx beams which may be QCL-ed for one or more QCL parameters (e.g. QCL parameters except for special Rx parameters, which may be referred to as a QCL type). The Tx beams for a beam group may be determined or selected by the WTRU based on a Tx beam group. For example, one or more Tx beam groups may be defined, and a WTRU may determine a Tx beam group for an Rx beam group.

Figure 4A:
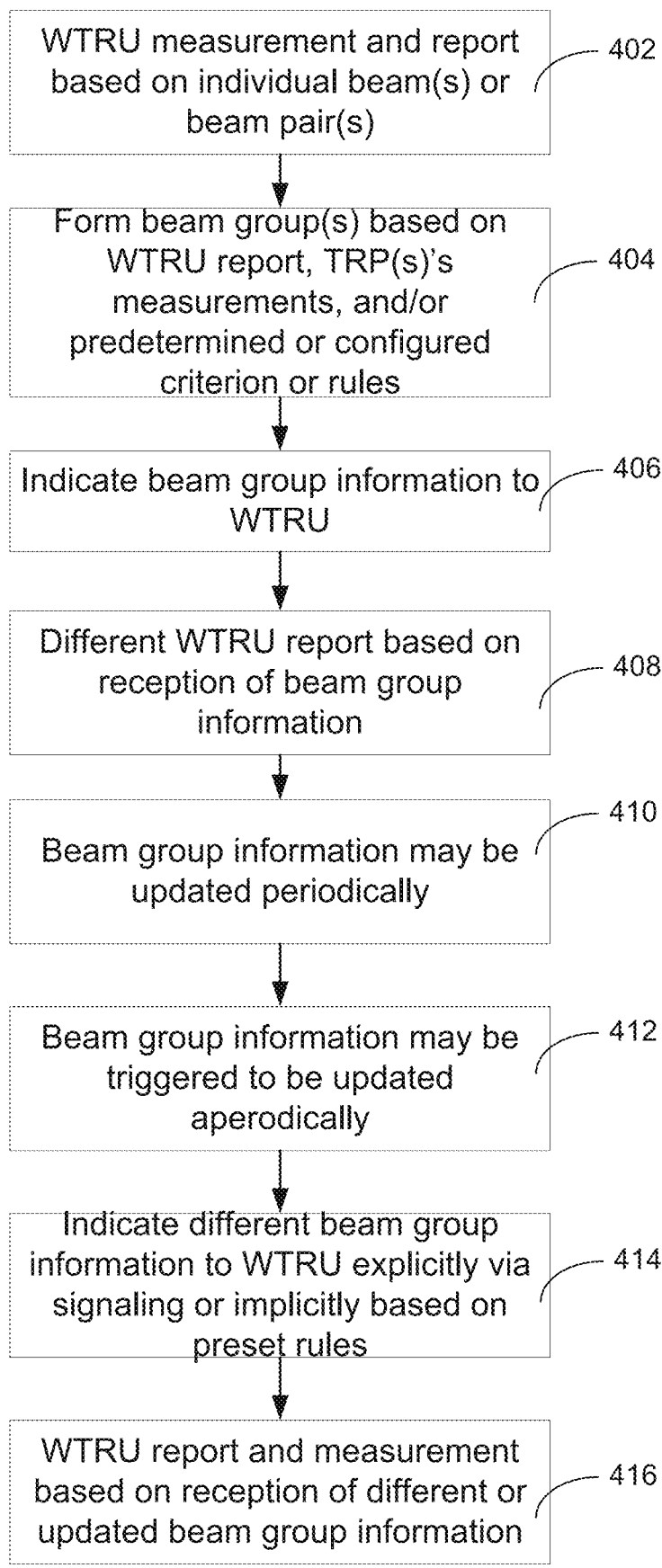
FIG. 4A depicts an example downlink (DL) group-based beam management.

Group-based beam management may be provided. DL group-based beam management may be provided. FIG. 4A shows example downlink (DL) group-based beam management. Group based beam management may be performed in L1 and/or L2. A multi-beam approach may be applied in order to increase network coverage by exploiting MIMO and beamforming gain. The rules, criteria or definition of beams, beam groups, and/or reciprocal beams may be enabled via dynamic signalling such as L1/2 control channel with configurable short or long periodicities or via semi-statically signalling e.g., in L3. The formation of beams may be performed using hybrid beamforming wherein slow analog beamforming may be used to create broad beams, and digital beamforming may be used to create fast narrow beams within an area of coverage of the analog beam(s). Beam refinement and/or beam group refinement may depend on the usage scenario and/or associated requirements.

A beam pair (BP) or beam pair link (BPL) may include a single DL beam with a single UL beam. A beam pair association (BPA) may include the discovery, identify, pairing, tracking and maintenance of a DL/UL beam with a UL/DL beam. A beam group (BG) may include two or more beams that have been identified as belonging to one another for a TRP and/or a WTRU. A BG may include beams from more than one TRP. A beam ID may be defined for an (e.g., each) instantiation of a beam, for example, for one or more of instance where a beam is used and/or described. A beam ID may include information pertaining to the TRP(s) and/or a WTRU to which the beam ID belongs. A BPA may include one or more of the following characteristics: rank, polarization, angle of arrival/departure, AoA/AoD spread, quasi-co-location (QCL), beamforming type (analog/digital/hybrid), coverage (omni/Sector, wide/narrow beam, etc.), and/or mobility metric. DL group based beam management may include a TRP process and/or a WTRU process. If there are more than one TRP, the TRP process may be coupled among the TRPs. A beam sweep (BS) may include a set of CSI-RS antenna ports, and/or beamformed transmissions may be used to facilitate measurement of individual beam characteristics at the WTRU and/or the TRP. A TRP, gNB or BS may be precoded on the CSI-RS antenna ports, and may use analog beamforming.

DL group based beam management may be enabled through measurement(s) at the WTRU of one or more BPAs. These measurements may be initiated and/or requested by the TRP. These measurements may be performed by the WTRU, for example, using one or more criterion defined by a process at the TRP.

The WTRU may perform measurement. The WTRU may perform BPA measurements associated with individual beams, and/or BPs. A measurement may include one or more or all of, but not limited to: beam rank, beam polarization, mean angle-or-arrival, angle-of-arrival spread, beamforming type e.g., analog, or hybrid, antenna WTRU port(s), mobility metric, or angular sector spread.

The WTRU may report a beam and/or beam pair (BP) measurement. A report (e.g., a single report) may be sent for a BP that may include the aggregated measurements on two or more beams. The aggregated measurements may include the mean of individual beam measurements.

A BP may include an anchor beam or beam pair (ABP), and associated secondary beam(s) or beam pair(s) (SBP). The beam measurements may be largely determined by the anchor beam or beam pair characteristics. The secondary beam(s) or beam pair(s) may be used for incremental refinement of a BP measurement report.

A beam group process may be used. When a TRP receives the BPA measurement, the TRP may create one or more beam groups using one or more criterion such that requirements for a (e.g., each) WTRU in a particular usage scenario is accounted for. The beam groups may be created based on the BPA measurements described herein. For example, a rank indicator (RI) may be used. If the rank indicator (RI) is low (e.g. LOS channel) the maximum number of beam pairs (e.g. two associated beams) may be two. A larger rank may dictate a larger number of available BPAs. The mean angle-of-arrival and/or angle-of-arrival spread may utilize QCL established between antenna ports, for example, to minimize the overhead of the measurement report(s). A beam group may belong to a particular analog beam ID. There may be one or more beam groups belonging to an analog beam ID. A mobility metric may determine stability of a particular beam group definition. A high mobility metric may imply that a fallback to an associated analog beam may be used (e.g., in case that loss of BPA occurs).

Beam group information may be used. Beam group information may include the TRP and/or WTRU IDs. A beam group may include a beam group belonging to a WTRU and/or a WTRU group ID. A beam group may include an anchor beam and associated secondary beams. A beam group which contains an anchor beam may be referred to as an Anchor Beam Group Pair (BPA). Beam group information may be reported periodically or a-periodically. The time/frequency resource for the a-periodic report may be included in the beam group information.

A beam group may be defined using resources that are defined (e.g., uniquely defined) for a (e.g., each) beam group, for example, to facilitate the mitigation of interference. In this way, a (e.g., each) beam group may expect to experience a different interference level, and the subsequent WTRU report may enable the TRP to identify beam groups with desirable characteristics.

A WTRU report may be used. The WTRU report may be configured to minimize feedback overhead. A beam pair report may include a quality report which is associated with a particular beam pair ID. The report may include one or more of RI, RSRP, or CQI. A report may be associated with a hierarchical definition of the beam pair ID. The beam pair ID may belong to an associated hierarchy. In the case of blockage, the WTRU report may include information which allows a fallback to an associated beam and/or beam pair. Beam group information may be updated periodically, for example, using information from the TRP. A periodic update may include all or a subset (e.g., only a subset) of the beam group information. Information from the TRP and/or an approach may be configured, for example, to trigger a-periodic WTRU report.

A beam group indication may be used. A beam group indication may be indicated to the WTRU explicitly and/or implicitly. An explicit indication may use associated beam group ID for indication. In the case of beam reciprocity, a CSI-RS configuration may be used for the beam group indication.

A beam group indication may be updated. In the event that blockage or a similar beam impairment occurs, the beam group indication may be updated. If an anchor beam is defined, and the anchor beam is not impaired, the anchor beam may be used to associate with an alternative secondary beam. In this case the beam group indication may re-use the resources for the anchor beam. If an anchor beam is compromised, a secondary beam may be predefined as a fallback beam.

DL group-based beam management may be performed. FIG. 4A is an example of group-based beam management.

At 402, a WTRU may perform measurement(s). The measurement(s) may be based on individual beam or beams, e.g., per-beam based measurement. The measurement may be based on beam pairs, e.g., per-beam pair based measurement. The WTRU may report the measurement either per-beam based, per-beam pair based or using a combination of them.

At 404, a TRP may start forming a beam group(s), for example, based on WTRU reports or measurements, when the TRP receives the measurements (e.g., per-beam, per-beam pair) that are reported from WTRU. The TRP may start forming a beam group(s), for example, based on TRP(s)'s measurement. For example, the formation of beam groups may be determined based on the TRP's own and/or gNB's measurements or inputs (e.g., interference conditions, traffic conditions, etc.). The formation of beam groups may be determined based on other TRP or gNB's measurements or inputs (e.g., interference conditions, traffic conditions, etc.) when multiple TRPs are considered. The formation of beam groups may be determined based on some predetermined or configured criteria or rules (e.g., as described herein).

At 406, beam group information may be indicated to the WTRU when the beam groups have been formed, for example, using dynamic signalling such as L1/2 signalling or semi-static signalling such as RRC signalling. The indication for the beam grouping may be implicit or explicit, for example, using the techniques and/or approaches described herein. For example, indication approaches using semi-static signalling may use the RRC signalling for RRC procedures and messages for group-based beam management as described herein. Indication approaches using explicit approaches may use the explicit group-based beam management signalling for mechanisms for explicit group-based beam indication as described herein. Indication approaches using implicit approaches may use the implicit group-based beam management signalling for mechanisms for implicit group-based beam indication as described herein. A combination of implicit and explicit indication approaches may be performed. Combination of dynamic L1/2 signalling and semi-static RRC signalling may be implemented. Combination of implicit and explicit indication approaches via either L1/2 approaches and/or higher layer approach may be performed.

At 408, when the WTRU receives the indication for group-based beam management information, the WTRU may start the measurement (e.g., a measurement different from a current or previous measurement) and reporting based on the group-based beam management information and/or beam group information.

At 410, WTRU measurement and reporting may use the approaches described herein for group-based beam reporting. Beam group information may be updated periodically.

At 412, the TRP may be triggered to update beam group information aperiodically. The TRP may be requested to update beam group information by a WTRU, TRP, gNB, or anchor cell. The TRP may be triggered to update beam group information by a different TRP (e.g., other TRP or TRPs than the TRP). The WTRU may suggest beam group information and/or send the suggested beam group information to the TRP or gNB. The reporting herein may be aperiodic.

At 414, the indication of a different or updated beam group may be indicated to the WTRU using the implicit or explicit approaches described herein, for example, when a different (e.g., different from the current or previous) beam group is formed. The WTRU may indicated explicitly via signalling or implicitly based on preset rules.

At 416, the WTRU may report measurement based on the different or updated beam group information.

Figure 4B:
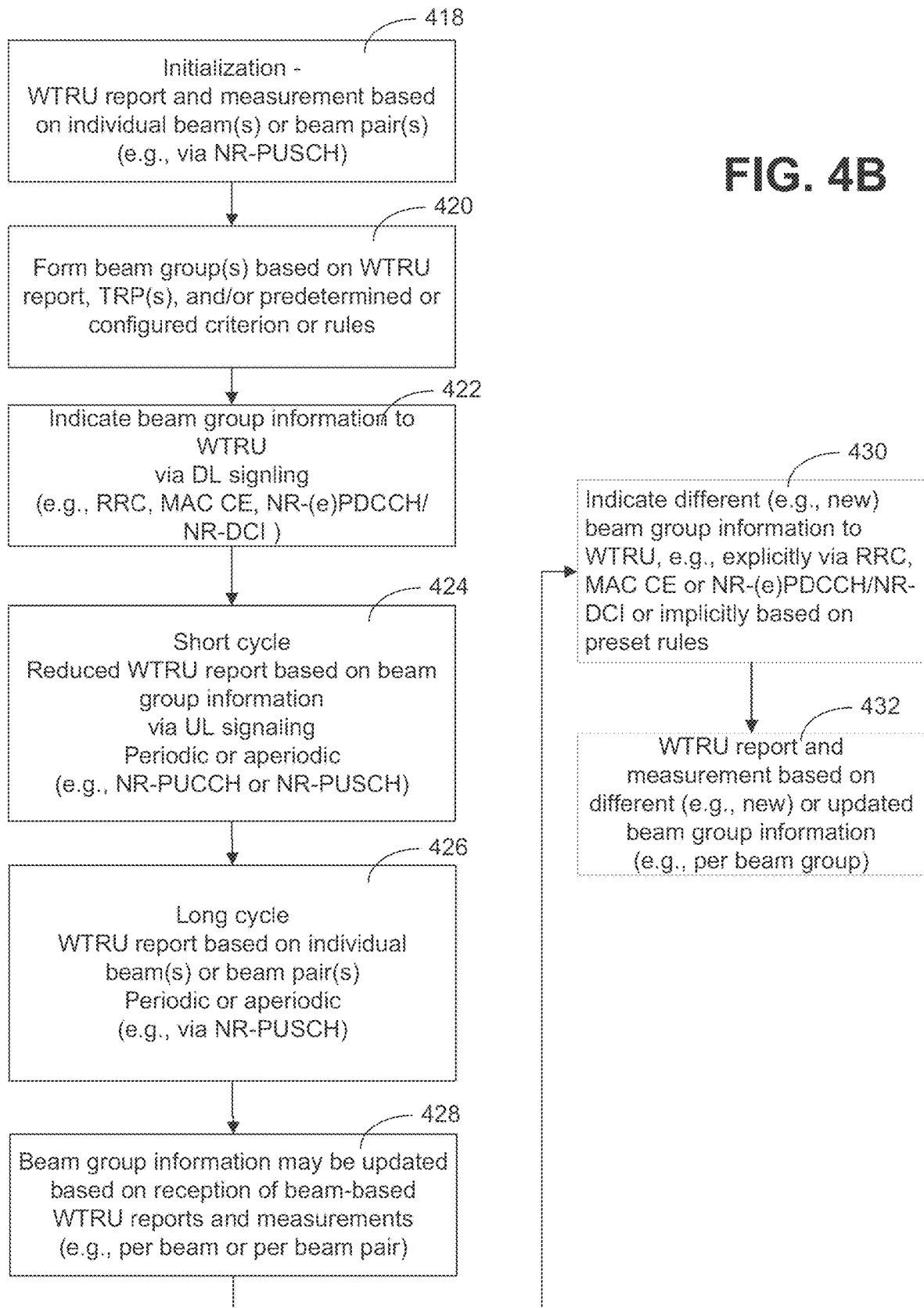
FIG. 4B depicts an example DL group-based beam management.

DL group-based beam management may be performed. FIG. 4B shows an example DL group-based beam management. At 418, a WTRU may perform the measurement during initialization. The measurement may be based on individual beam, beams or beam pairs. The WTRU may report (e.g., beam-based reporting) the measurement per-beam based, per-beam pair based or combination of them, for example, via NR-PUSCH.

At 420, when a TRP receives the measurement(s) (e.g., per-beam, per-beam pair) that is reported from the WTRU, the TRP may start forming one or more beam groups based on WTRU's reports or measurements. The beam groups may be determined based on the TRP's own or gNB's measurements or inputs (e.g., interference conditions, traffic conditions, etc.). The beam groups may be determined based on a different TRP(s)'s (e.g., TRPs other than the TRP) or gNB's measurements or inputs (e.g., interference conditions, traffic conditions, etc.) when multiple TRPs are considered. The formation of beam groups may be determined based on some predetermined or configured criteria or rules as described herein.

At 422, the beam group information may be indicated to the WTRU, for example, using dynamic signalling via NR-PDCCH or NR-ePDCCH with DCI, MAC or MAC CE, or RRC signalling. The beam group information may be indicated to the WTRU implicitly, for example, based on some preset rules.

At 424, the WTRU may start a different (e.g., different from a current or previous) measurement and reporting for group-based beam management. The different measurement and reporting for group-based beam measurement and reporting may be different from non-group based (e.g., per-beam or beam-based reporting) beam measurement and reporting. A short cycle may be used to start reporting the different measurement. A short cycle may be configured. For example, the WTRU may be configured with different beam reporting cycle or different periodicities (e.g., short or long cycles or periodicities). During short cycles, a reduced WTRU report based on beam group information (e.g., group-based reporting) may be transmitted. The group-based reporting may be associated with a reduced level of reporting comparing to a level of reporting associated with beam-based reporting. The reduced WTRU report based on beam group information may be transmitted via UL signalling periodically or aperiodically for example, periodically using NR-PUCCH or aperiodically using NR-PUSCH or MAC-CE, for example where the reduced WTRU report associated with the short cycle is a reduced level of reporting compared to a level of reporting associated with a long cycle.

At 426, the WTRU may reset the measurement and reporting for group-based beam management. A different cycle (e.g., a long cycle) from the short cycle may be used to start resetting the measurement. For example, the long cycle may include one or more short cycles. During a long cycle, a WTRU report based on individual beam(s) or beam pair(s) (e.g., a beam-based report (e.g., reporting based on configured or non-configured one or more individual beams or reporting via a non-group-based reporting), a report that is not reduced, or a full report) may be transmitted via UL signalling periodically or aperiodically. For example, the beam-based report may be transmitted via NR-PUCCH or NR-ePUCCH periodically, for example, every N short cycles. The beam-based report may be transmitted less often than the group-based report. The beam-based report may be triggered or requested and transmitted via NR-PUCCH or NR-ePUCCH aperiodically.

At 428, beam group information may be updated, for example, based on a reception of the beam-based report and measurements (e.g., per beam or per beam pair).

At 430, the updated beam group information may be indicated to the WTRU, for example, using dynamic signalling via NR-PDCCH or NR-ePDCCH with DCI, MAC or MAC CE, or RRC signalling. The updated beam group information may be indicated to the WTRU implicitly, for example, based on some preset rules.

At 432, the WTRU may report and/or measure based on different or updated beam group information on a per beam group basis (e.g., group-based reporting).

Figure 5:
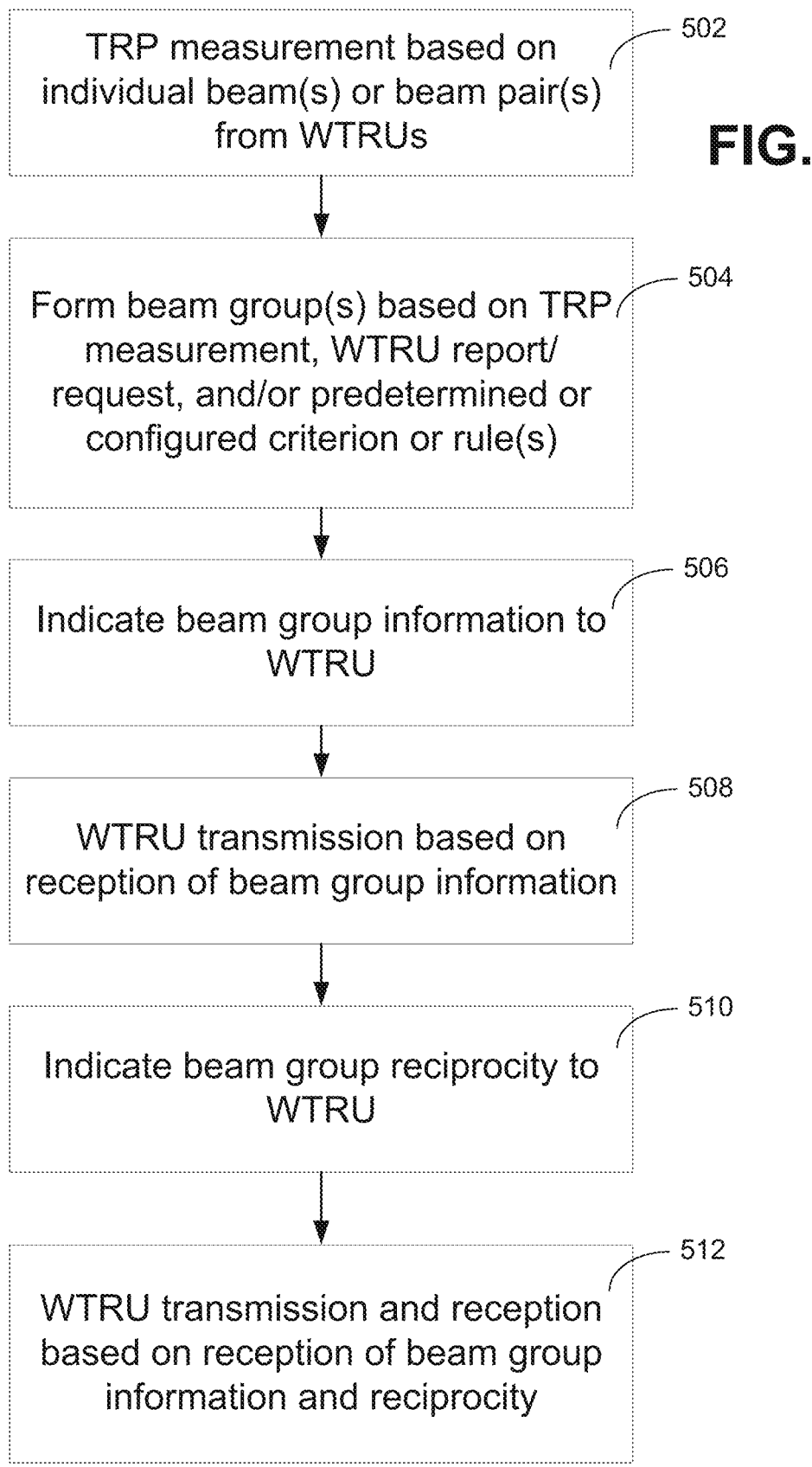
FIG. 5 depicts an example DL group-based beam management.

UL group-based beam management may be performed. FIG. 5 illustrates an example of UL group-based beam management if channel reciprocity or beam reciprocity/beam correspondence is available. At 502, a TRP may perform the measurement for an individual beam(s) or beam pair(s) that are transmitted from a WTRU. At 504, a beam group(s) may be formed according to the TRP measurement. A beam group(s) may be formed based on some WTRU report(s) or WTRU request(s). Formation of beam group may be determined based on some predetermined rules or configured criterion.

At 506, beam group information may be indicated to the WTRU, for example, using implicit or explicit approaches such as those approaches described herein. For example, indication approaches using semi-static signalling may use RRC signalling for RRC procedures and messages for group-based beam management as described herein. Indication approaches using explicit approaches may use explicit group-based beam management signalling, for example, as described herein. Indication approaches using implicit approaches may use implicit group-based beam management signalling for mechanisms for implicit group-based beam indication, for example, as described herein. A combination of implicit and explicit indication approaches may be performed. Combination of dynamic L1/2 signalling and semi-static RRC signalling may be implemented. Combination of implicit and explicit indication approaches via L1/2 approaches and/or a higher layer approach may be performed.

At 508, a different WTRU transmission (e.g., different from the current or previous one) may be performed, for example, based on reception of the beam group information.

At 510, beam group reciprocity may be indicated to the WTRU. At 512, WTRU transmission and/or reception may be performed based on the reception of beam group information including beam group reciprocity.

A group-based beam indication(s) may be used. The group-based beam indication(s) may be used for beam measurement, beam-based transmission, and/or beam switching. The group-based beam indication(s) may be (e.g., explicitly) signalled to the WTRU, for example, via RRC message, MAC CE or NR-(e)PDCCH/NR-DCI, or implicitly based on some pre-defined rules.

Figure 6:
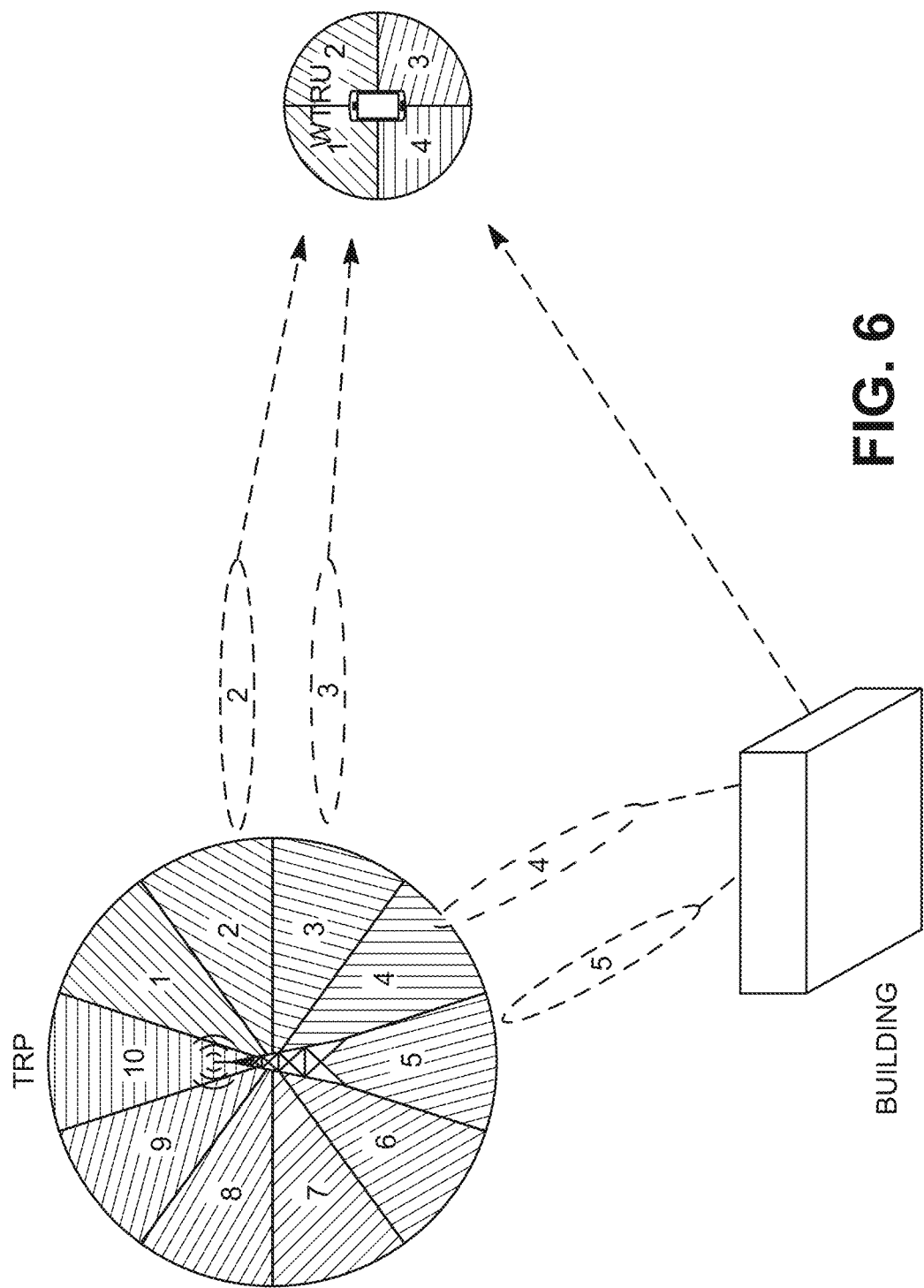
FIG. 6 depicts an example beam group.

Processes and messages for group-based beam indication(s) may be used. Impact(s) of WTRU mobility, WTRU rotation, and/or blockage on beam groups may be considered. FIG. 6 may be a DL transmission example showing the impacts of the WTRU mobility, WTRU rotation, and/or blockage on beam groups. As shown in FIG. 6, there are 10 Tx beams at the TRP, and 4 Rx beams at the WTRU. TRP's Tx beams 2 and 3 may have a similar transmission path(s) to the WTRU, and the TRP's Tx beams 2 and 3 may be received by the WTRU's Rx beam 1. TRP's Tx beams 4 and 5 may have similar transmission path to WTRU, and the TRP's Tx beams 4 and 5 may be received by WTRU's RX beam 4. In this example, the beam group 1 may include Tx beam {2,3}, and Rx beam {1}, and the Tx beam group 2 may include Tx beam {4,5} and Rx beam {4}.

Figure 7:
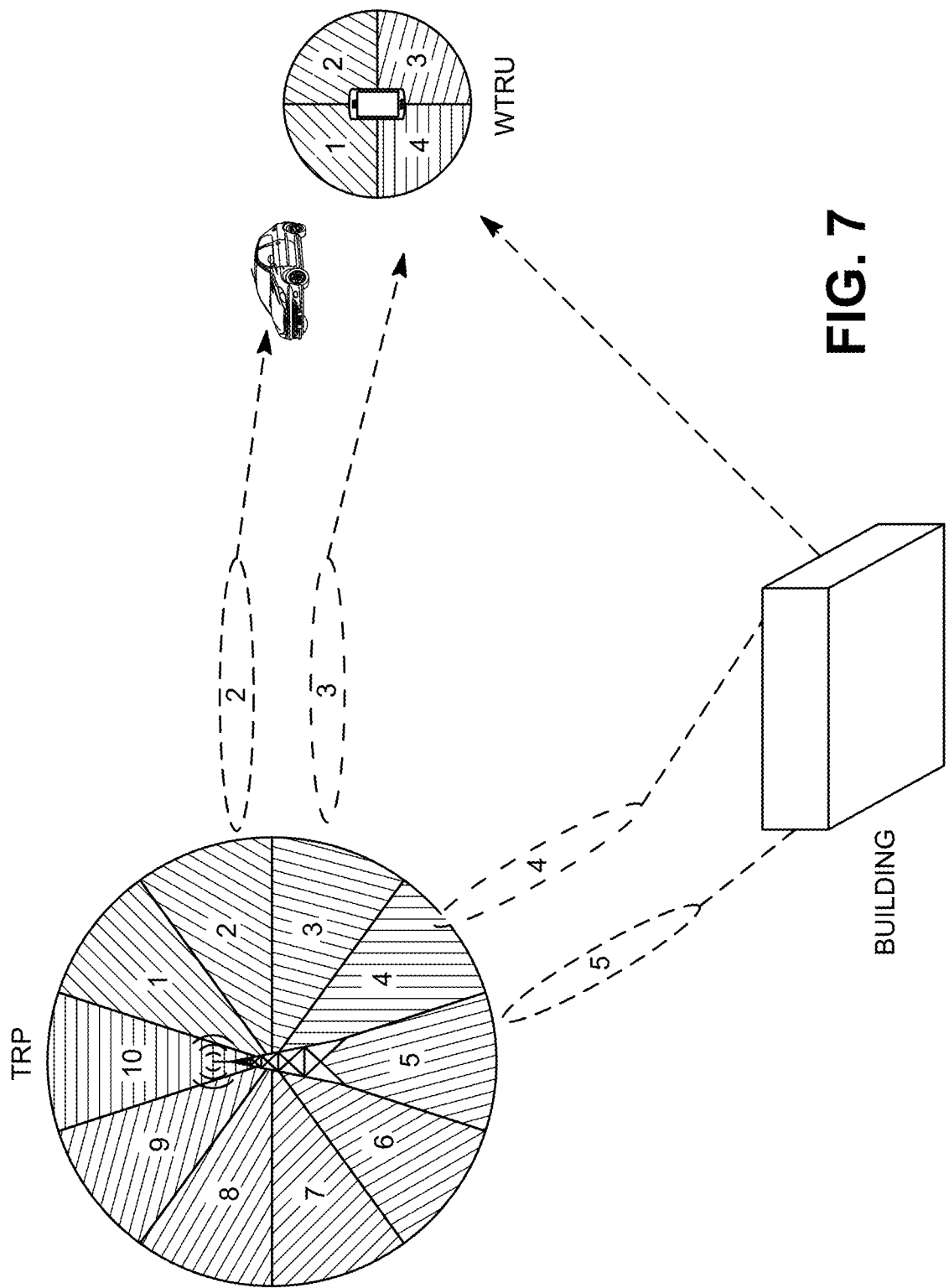
FIG. 7 depicts an example beam group affected by a blockage.

The beam group may be affected by the blockage. As shown in FIG. 7, a car may block the TRP's TX beam 2. With the blockage, the beam group 1 may include Tx beam {3}, and Rx beam {1}, and the Tx beam group 2 may include Tx beam {4,5} and Rx beam {4}.

Figure 8:
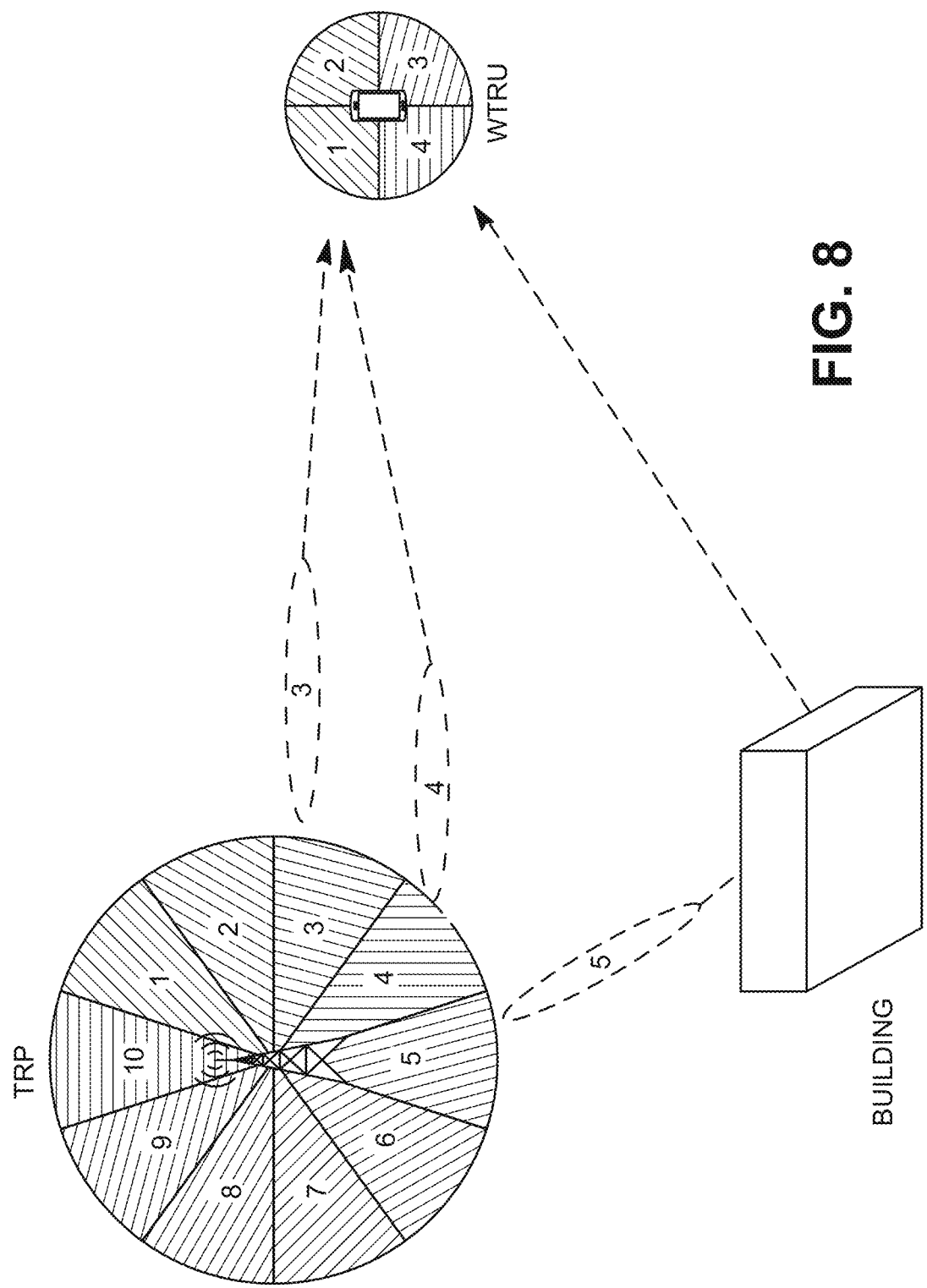
FIG. 8 depicts an example beam group affected by a WTRU rotation.

The beam group may be affected by WTRU mobility. The WTRU in FIG. 6 may move to a different location as shown in FIG. 8. At the different location in FIG. 8, the TRP's Tx beam 3 and 4 may have similar transmission path(s) to the WTRU, and the TRP's Tx beam 3 and 4 may be received by WTRU's Rx beam 1. TRP's Tx beam 5 may be received by the WTRU's RX beam 4. With the WTRU mobility, the beam group 1 may include Tx beam {3,4}, and Rx beam {1}, and the Tx beam group 2 may include Tx beam {5} and Rx beam {4}.

The beam group may be affected by WTRU rotation. The WTRU in FIG. 6 may rotate to a different orientation. At the different WTRU orientation, the TRP's Tx beam 3 and 4 may have similar transmission path(s) to the WTRU, and the TRP's Tx beam 3 and 4 may be received by WTRU's Rx beam 1. TRP's Tx beam 5 may be received by the WTRU's RX beam 4. With the WTRU rotation, the beam group 1 may include Tx beam {3,4}, and Rx beam {2}, and the Tx beam group 2 imay include Tx beam {5} and Rx beam {1}. In the case of WTRU rotation, the Tx beams may not be adjusted in a beam group.

Figure 10:
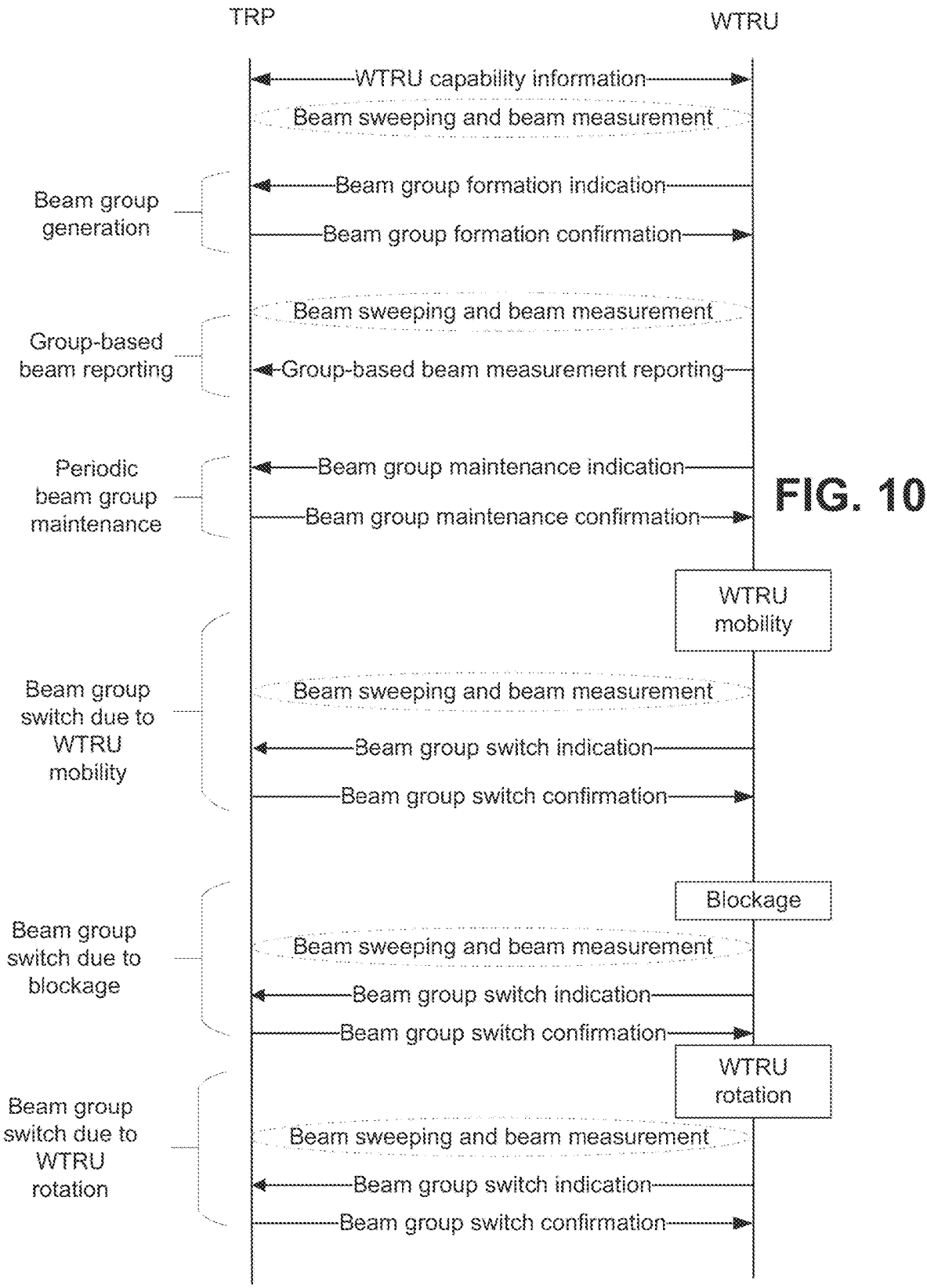
FIG. 10 depicts an example message call flows for beam group generation, reporting, and/or maintenance for the case of multiple TRPs.

Processes and/or messages may be used for group-based beam operations. FIG. 10 shows an example for group-based beam formation, reporting and maintenance. A TRP may use different beams for the TRP's serving area, and a WTRU may try to perform the beam sweeping and/or measurement. The WTRU and TRP may exchange WTRU capability information, which may include the beam capabilities, as described herein.

The WTRU may generate the beam group, for example, based on the WTRU's measurement. The beam group(s) may be summarized in a table. Take the example in FIG. 6, which is summarized in Table 2 below.

TABLE 2

Example of beam group formation (e.g., for the example in FIG. 6)

| Group Id | Component Tx beam | Component Rx beam |
|---|---|---|
| 1 | 2, 3 | 1 |
| 2 | 4, 5 | 4 |

The WTRU may send beam group formation to the TRP with the beam group information as shown in TABLE 2. The TRP may confirm an beam group formation indication. The beam group formation (e.g., TABLE 2) may be summarized and/or indicated in the example beam group IE as follows:

```
BeamgroupList ::=   SEQUENCE (SIZE (1..maxGroupNum)) OF Beamgroup
Beamgroup ::= SEQUENCE{
    groupIndex      INTEGER (1..maxGroupNum)
    TXbeamList      SEQUENCE(SIZE (1.. maxTxBeamNum)) OF BeamId
    RXbeamList      SEQUENCE(SIZE (1.. maxRxBeamNum)) OF BeamId
}
``` where "Beam Id" may indicate an index of the Tx/Rx beam, "maxTxBeamNum" may indicate the maximum number of Tx beams (e.g., 10 in FIG. 6); "maxRxBeamNum" may indicate the maximum number of Rx beams (e.g., 4 in FIG. 6), "maxGroupNum" may indicate the maximum number of beam groups.

The WTRU may periodically measure the TX beams from the TRP. The WTRU may report the WTRU's measurement in terms of RSRP, CSI, etc. for example, as described herein. The measurement report may be based on a beam group(s) rather than on individual beam(s), for example, to reduce signalling overhead.

TABLE 3

Example of beam group reporting

| Group Id | RSRP | CSI |
|---|---|---|
| 1 | A1 | Z1 |
| 2 | A2 | Z2 |

The WTRU may send the group-based beam measurement report to the TRP, with the example information in TABLE 3. The group-based beam reporting (e.g., TABLE 3) could be summarized in the example beam group report IE as follows:

```
BeamgroupReportList ::= SEQUENCE (SIZE (1..maxGroupNum)) OF BeamgroupReport
BeamgroupReport ::= SEQUENCE{
    groupIndex              INTEGER (1..maxGroupNum)
    rsrp                    RSRP-Range
    csi                     CSI-Range
}
```

The WTRU may maintain a current beam group if there is no changes (e.g., substantial changes) on the channels and/or environments. The WTRU may send (e.g., periodically send) a beam group maintenance indication message to the TRP, and the TRP may confirm the group maintenance to the WTRU.

In the case of WTRU mobility (e.g., as shown in FIG. 8), the beam group information may be changed accordingly. With the beam measurement results, the WTRU may send a beam group switch indication message to the TRP. The beam group switch indication message may contain a set of updated beam group information (e.g., as shown in TABLE 4). The beam group switch indication message may include a changed part of the beam group information. The beam group switch indication message may include a reason for the update (e.g., WTRU mobility), if the reason is known to the WTRU.

TABLE 4

Example of beam group update for WTRU mobility

| Group Id | Component Tx beam | Component Rx beam | Update reason (Optional) |
|---|---|---|---|
| 1 | 3, 4 | 1 | UE mobility |
| 2 | 5 | 4 | |

The TRP may update the TRP's local data base and/or send a confirmation to the WTRU, for example, once the TRP receives the beam group update information.

The beam group update information (e.g., TABLE 4) may be summarized in an example beam group IE herein. The example beam group IE may include a (e.g., full) set of the updated beam group information. An extension may be added to indicate the reason for the update. For example, "initial" may indicate the initial beam group formation, "UE mobility" may indicate the update due to WTRU mobility, "blockage" may indicate the update due to blockage, and "UE rotation" may indicate the update due to WTRU rotation, etc.

```
BeamgroupList ::=   SEQUENCE (SIZE (1..maxGroupNum)) OF Beamgroup
Beamgroup ::= SEQUENCE{
    groupIndex    INTEGER (1..maxGroupNum)
    TXbeamList    SEQUENCE(SIZE (1.. maxTxBeamNum)) OF BeamId
    RXbeamList    SEQUENCE(SIZE (1.. maxRxBeamNum)) OF BeamId
    Reason        ENUMERATED {initial, UE mobility, blockage, UE rotation}   OPTIONAL
}
```

In the case of blockage (e.g., as shown in FIG. 7), the beam group information may be changed accordingly. With the beam measurement results, the WTRU may send a beam group switch indication message to the TRP. The beam group switch indication message may contain a (e.g., full) set of the updated beam group information (e.g., as shown in TABLE 5). The beam group switch indication message may include a changed part of the group information. The beam group switch indication message may add the reason for the update (e.g., blockage) if the reason is known to a WTRU. The TRP may update the TRP's local data base and/or send a confirmation to the WTRU, for example, once the TRP receives such beam group update information.

TABLE 5

Example of beam group update for blockage

| Group Id | Component Tx beam | Component Rx beam | Update reason (Optional) |
|---|---|---|---|
| 1 | 3 | 1 | Blockage |
| 2 | 4, 5 | 4 | |

Figure 9:
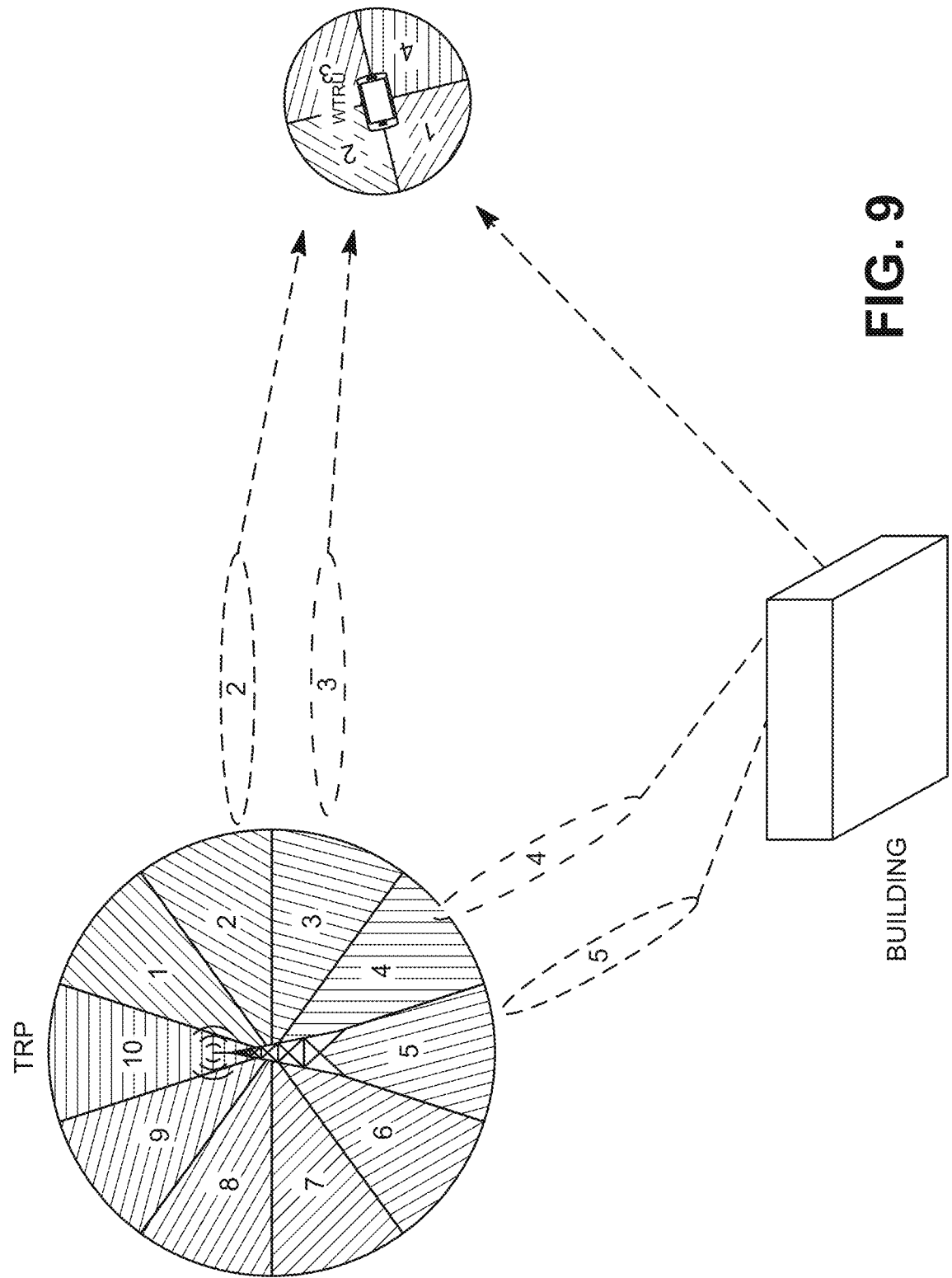
FIG. 9 depicts an example message call flows for beam group generation, reporting, and/or maintenance.

In the case of WTRU rotation (e.g., as shown in FIG. 9), the beam group information may be changed accordingly. With the beam measurement results, the WTRU may send a beam group switch indication message to the TRP. This beam group switch indication message may contain a (e.g., full) set of the updated beam group information (e.g., as shown in TABLE 6). The beam group switch indication message may contain a changed part of the group information. The beam group switch indication message may add the reason for the update (e.g., WTRU rotation) if the reason is known to the WTRU. The TRP may update the TRP's local data base and/or send a confirmation to the WTRU, for example, once the TRP receives such beam group update information,

TABLE 6

Example of beam group update for UE rotation

| Group Id | Component Tx beam | Component Rx beam | Update reason (Optional) |
|---|---|---|---|
| 1 | 2, 3 | 2 | UE rotation |
| 2 | 4, 5 | 1 | |

FIG. 10 illustrates an example of a group-based beam operation between a single TRP and a WTRU. As shown in FIG. 10, the group-based beam operation between the single TRP and the WTRU may include beam group generation, group-based beam reporting, periodic beam group maintenance, and/or beam group switch due to WTRU mobility, blockage, and/or WTRU rotation. The TRP and the WTRU may exchange WTRU capability information. Beam sweeping and/or beam measurement may occur between the TRP and the WTRU. Beam group generation may include the WTRU sending a beam group formation indication to the TRP and/or the TRP sending a beam group formation confirmation to the WTRU. The group-based beam reporting may include beam sweeping and/or beam measurement between the TRP and the WTRU, and the WTRU sending the group-based beam measurement reporting to the TRP. The periodic beam group maintenance may include the WTRU sending a beam group maintenance indication to the TRP and the TRP sending a beam group maintenance confirmation to the WTRU. The beam group switch due to WTRU mobility may include a WTRU mobility, beam sweeping and/or beam measurement, the WTRU sending a beam group switch indication to the TRP, and/or the TRP sending a beam group switch confirmation to the WTRU. The beam group switch due to blockage may include a blockage, beam sweeping and/or beam measurement, the WTRU sending a beam group switch indication to the TRP, and/or the TRP sending a beam group switch confirmation to the WTRU. The beam group switch due to WTRU rotation may include a WTRU rotation, beam sweeping and/or beam measurement, the WTRU sending a beam group switch indication to the TRP, and/or the TRP sending a beam group switch confirmation to the WTRU.

Figure 11:
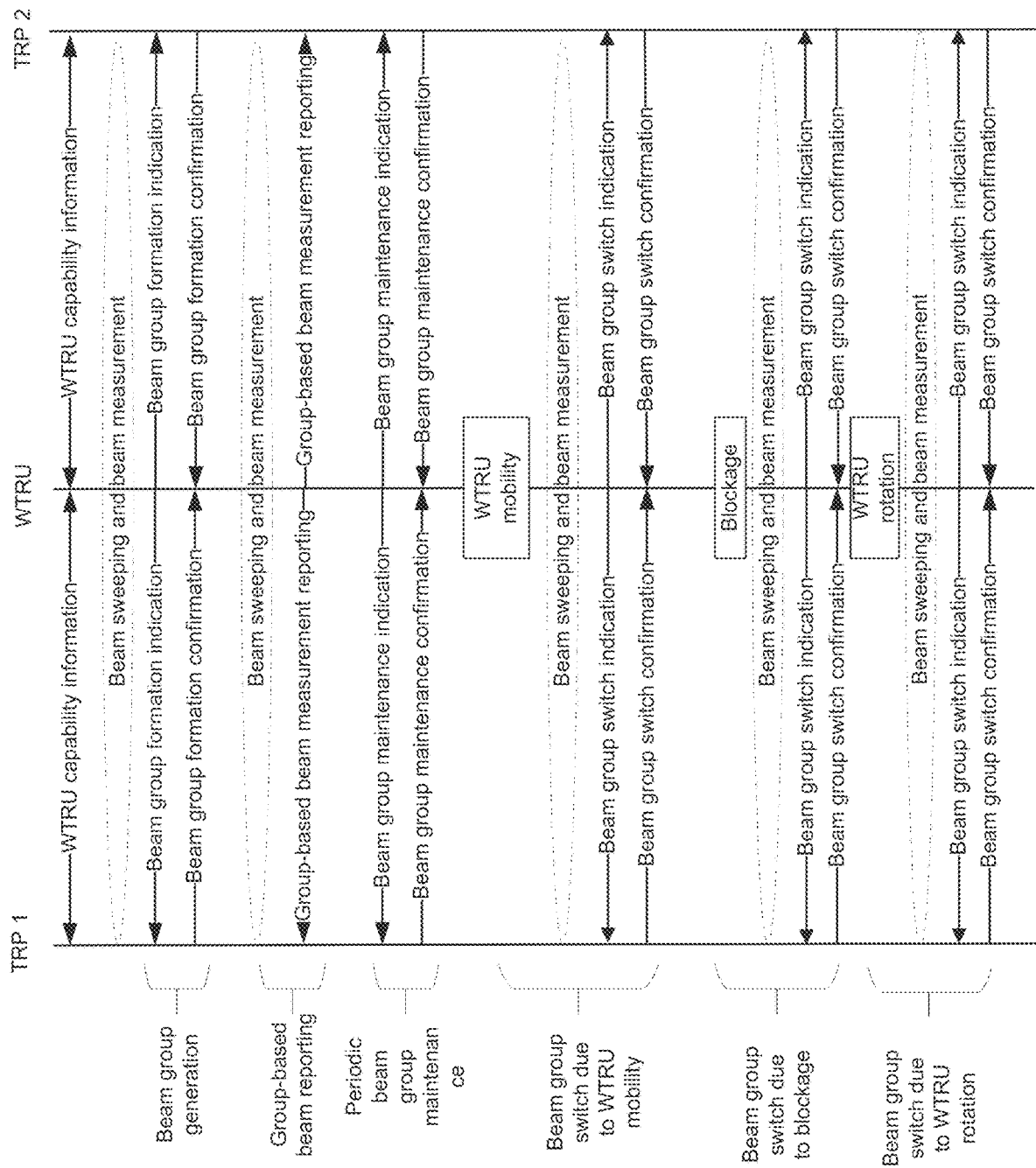
FIG. 11 depicts an example use of a different modulation type for punctured data.

The example in FIG. 10 may be extended to multiple TRPs. FIG. 11 shows an example of group-based beam operations over two TRPs, where the TRPs are not transparent to the WTRU. As shown in FIG. 11, the group-based beam operation between the two TRPs and the WTRU may include beam group generation, group-based beam reporting, periodic beam group maintenance, and/or beam group switch due to WTRU mobility, blockage, and/or WTRU rotation. The TRPs and the WTRU may exchange WTRU capability information. Beam sweeping and/or beam measurement may occur between the TRPs and the WTRU. Beam group generation may include the WTRU sending beam group formation indications to the TRPs and/or the TRPs sending beam group formation confirmations to the WTRU. The group-based beam reporting may include beam sweeping and/or beam measurement between the TRPs and the WTRU, and the WTRU sending the group-based beam measurement reporting to the TRPs. The periodic beam group maintenance may include the WTRU sending beam group maintenance indications to the TRPs and the TRPs sending beam group maintenance confirmations to the WTRU. The beam group switch due to WTRU mobility may include a WTRU mobility, beam sweeping and/or beam measurement, the WTRU sending beam group switch indications to the TRPs, and/or the TRPs sending a beam group switch confirmations to the WTRU. The beam group switch due to blockage may include a blockage, beam sweeping and/or beam measurement, the WTRU sending beam group switch indications to the TRPs, and/or the TRPs sending beam group switch confirmations to the WTRU. The beam group switch due to WTRU rotation may include a WTRU rotation, beam sweeping and/or beam measurement, the WTRU sending beam group switch indications to the TRPs, and/or the TRPs sending beam group switch confirmations to the WTRU.

Techniques for explicit group-based beam indication may be provided. A group-based beam indication(s) may be (e.g., explicitly) signalled to a WTRU via RRC signalling, L2 or L1 signalling such as MAC CE or NR-(e)PDCCH/NR-DCI, or RAR grant. The group-based beam indication(s) may include one or a (e.g., any) combination of the following: A TRP or gNB may indicate a beam group to facilitate the WTRU's data reception; the TRP or gNB may indicate intra-group or inter-group beam measurement for beam tracking, transmission, and/or switching (e.g., intra-group beam switching may or may not be singled between the TRP/gNB and the WTRU. Inter-group beam group switching may be informed between the TRP/gNB and the WTRU); the TRP/gNB may indicate the number of beam groups to be measured and/or reported by the WTRU; the TRP/gNB may indicate which beam group to be measured and/or reported by the WTRU; the TRP/gNB may indicate what type of beam measurement information (BMI) or beam related information (BRI) to be reported by the WTRU; and/or group-based beam report may be done in a periodic or aperiodic manner, e.g., configured by the TRP or gNB (e.g., the TRP/gNB may indicate a type of periodic NR-PUCCH feedback. The TRP/gNB may indicate time/frequency resource(s) for a aperiodic report).

A group-based beam indication(s) (e.g., one or more of the indications herein) may be explicitly signalled, or implicitly signalled if the TRP/gNB does not know (e.g., not exactly know) the WTRU's measurement capability. For example, a threshold for the associated or corresponding BMI or BRI (e.g., instead of explicitly signaling an exact number of beam groups to be measured and reported by the WTRU) may be signalled to the WTRU. The WTRU may automatically or implicitly determine the number of beam groups to be reported to the TRP/gNB. In an example implementation, the TRP/gNB may signal a reporting threshold and associated BMI. When the beam group's measurement is above the reporting threshold, the corresponding beam group's BMI will be reported. In an example implementation, the TRP/gNB may signal a non-reporting threshold and associated BMI. When the beam group's measurement is below the non-reporting threshold, the corresponding beam group's BMI will not be reported. In an example implementation, the TRP/gNB may signal a reporting threshold and associated BMI, and a minimum number of beam groups to be reported. When a total number of the beam groups whose measurement is above the reporting threshold is less than the explicitly signalled minimum number of beam group, the WTRU may report at least signalled/required minimum of beam groups information.

Figure 12:
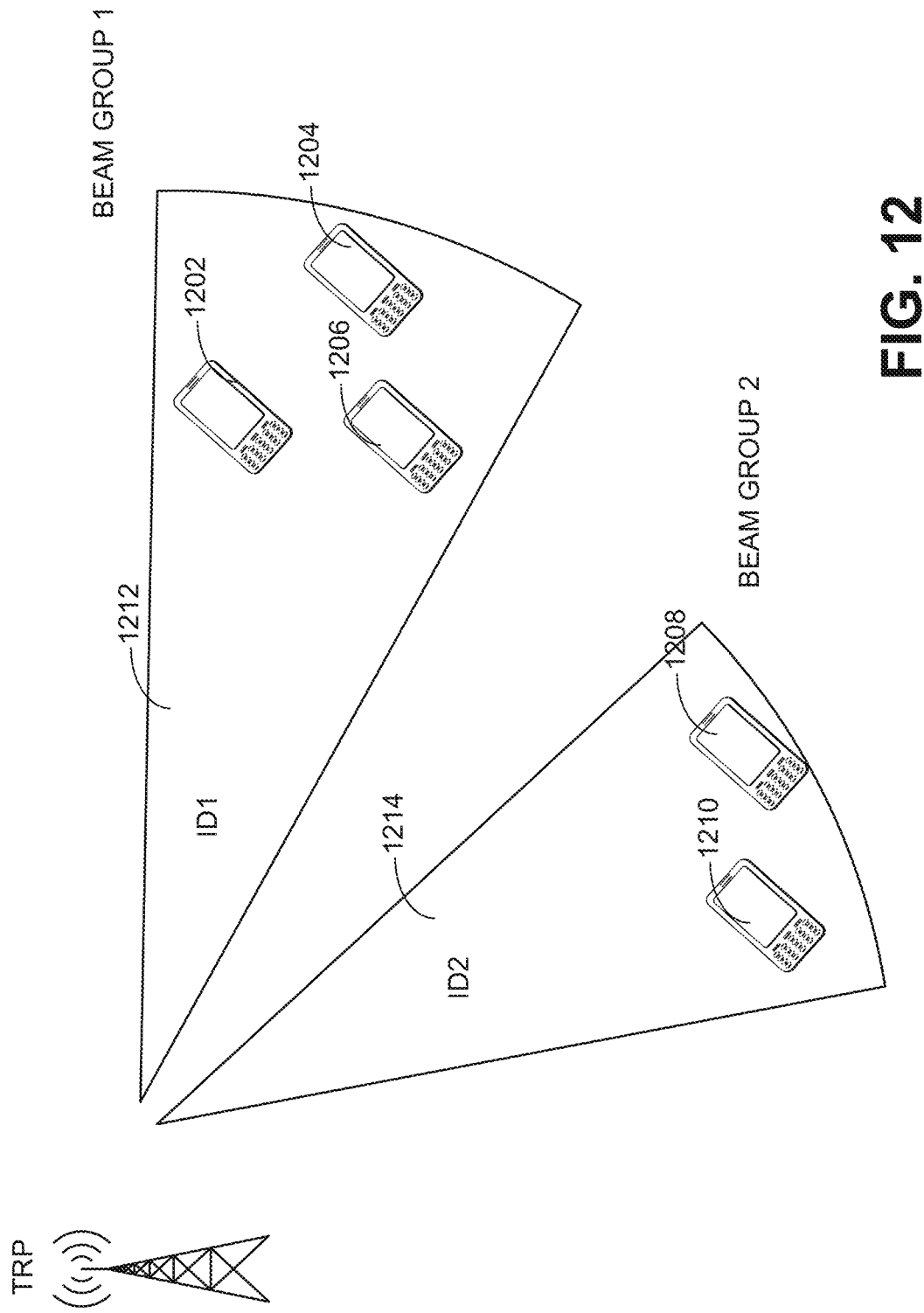
FIG. 12 depicts an example multi-beam transmission system.

Techniques for implicit group-based beam indication may be provided. A group-based beam indication(s) may be implicitly signalled to the WTRU, for example, based on preset rules as described herein. FIG. 12 shows an example of a multi-beam transmission system where different WTRUs are grouped under a similar beam(s). As shown in FIG. 12, WTRUs 1202, 1204, and 1206 may be grouped under beam 1212 (e.g., in beam group 1). WTRUs 1208 and 1210 may be grouped under beam 1214 (e.g., in beam group 2). In a multi-beam transmission system, a beam may be carrying independent information intended for a specific group of receive units. A receive unit(s) may determine an identity(s) of a (e.g., each) transmitted beam and/or implement a receive beamforming for a selected or desired DL transmitted beam. For example, for proper demodulation and interference management, a receive unit(s) may determine an identity(s) of a (e.g., each) transmitted beam and/or implement an accurate receive beamforming for the selected or desired DL transmitted beam.

The receive unit may be enabled to identify the desired beam, for example, based on a transmission of an identifier. The identifier may be unique. The transmitter unit may embed the identifier per transmitted beam to assist identification of the desired beam by the receive unit. The identifier may be selected from a pool of the orthogonal or semi-orthogonal signals (e.g., signals that are already known to both transmit and receive units). For example, a unique identifier signal may be implemented in a number of different ways including one or more of transmission of a sequence, usage pattern of specific resources, or through a feature or property of the waveform. A single identifier or a combination of multiple identifiers may be used.

Figure 13:
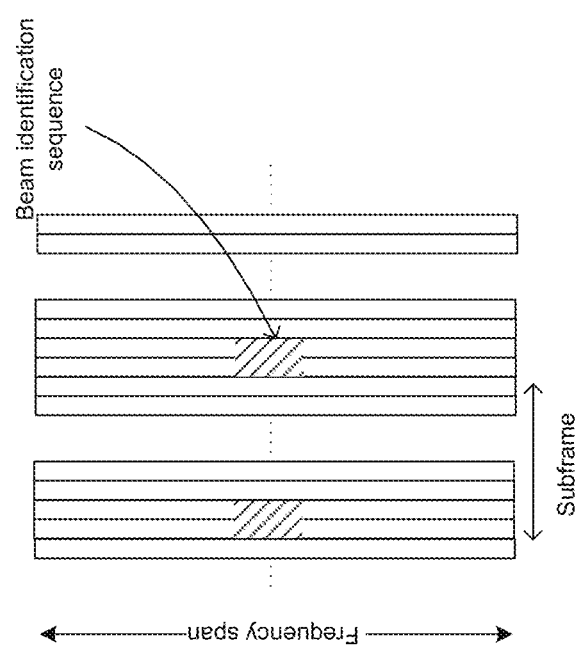
FIG. 13 depicts an example per beam transmission of an identification sequence.

The receive unit may be enabled to identify the desired beam based on detection of a transmitted sequence(s). A sequence(s) with good correlation properties may be transmitted on a dedicated resource(s). For example, a ZC sequence that is defined with different lengths may be used. A longer sequence may be used when a higher reliability for beam separation is used (e.g. required). As shown in FIG. 13, the sequence may be mapped on a number of resources that span over the frequency and the time and/or transmitted in a periodic or a-periodic manner. The sequence may be beamformed by the same beamformer as used for other channel(s).

The location of the dedicated resources may be fixed (e.g., always fixed) or configured. In a DL scenario, information about a location of an identifier signal may be available, for example, semi-statically or through initial RRC signalling.

For a (e.g., each) beam-group, resources considered for transmission of the identifier sequence(s) may have the same configuration as other beams and/or may be configured independent of others. The configuration information may include, one or more of, but not limited to, size(s) of the resources, as different beams may be configured with sequences of different length, resource location definition(s) of the resources in time/frequency grid, and/or frame and/or subframe periodicity and time off-set of transmission(s) of the identifier sequence(s).

Figure 14:
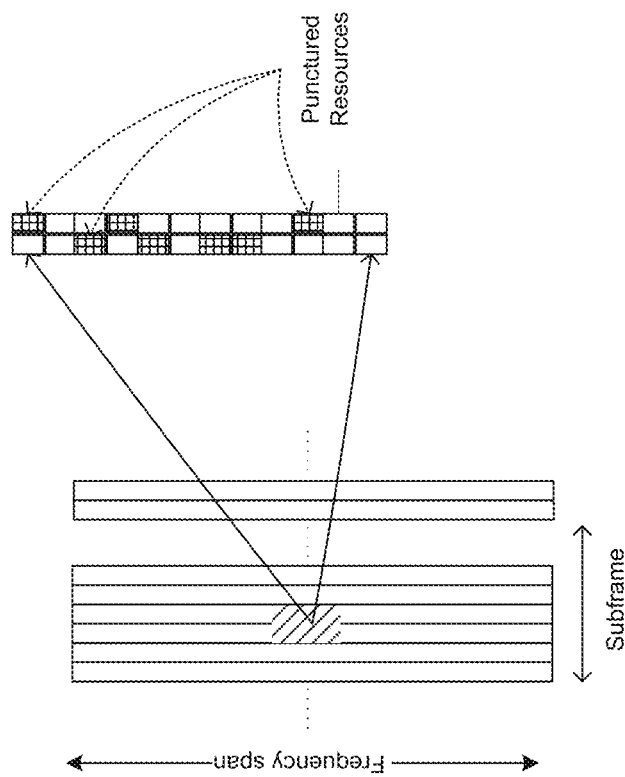
FIG. 14 depicts an example beam-group identification by puncturing pattern.

Beam-group identification may be performed through a usage pattern of specific resources. Some of resources may be used in a specific manner to indicate an identity(s) of a beam-group(s). For example, a finite set of resources that are used for data transmission may be punctured with a specific pattern to indicate the identity(s) of the beam-group(s). FIG. 14 shows an exemplary implementation where a finite set of the resources that were originally considered for another channel, e.g., shared data, may be punctured according to the beam identity(s). Data may be effectively punctured or rate-matched around a punctured location. It may be assumed that a WTRU is aware of a general location of the identification resources. The WTRU may perform hypothesis testing to identify the punctured/null location(s) to determine an employed puncturing pattern representing the beam-group identification and/or demodulate the transmitted data.

The location(s) of dedicated resources may be fixed (e.g., always fixed) or configured. In a DL scenario, information about the location(s) of the set of resources used for puncturing may be available, for example, semi-statically or through initial RRC signalling.

For a given beam-group, a resource block(s) considered for puncturing may have the same configuration as other beams and/or may be configured independent of others. The configuration information may include one or more of, but not limited to, a size(s) of the set of resources for puncturing, as different beams may be configured with different block sizes, resource location definition(s) of the block(s) considered for puncturing in a time/frequency grid, and/or frame and/or subframe periodicity and time off-set of transmission of the block(s) for puncturing.

Beam-group identification may be based on a specific use of pattern. A beam may be configured with a different set of RS patterns. The difference in a (e.g., each) pattern may be reflected in the location, the density, and/or distribution of RS's across a subframe. The number of potential patterns may be limited and/or may be known to WTRUs. A WTRU may begin demodulation by hypothesis testing of a different pattern(s) to determine the beam identity and/or perform other demodulation-related processing.

Figure 15:
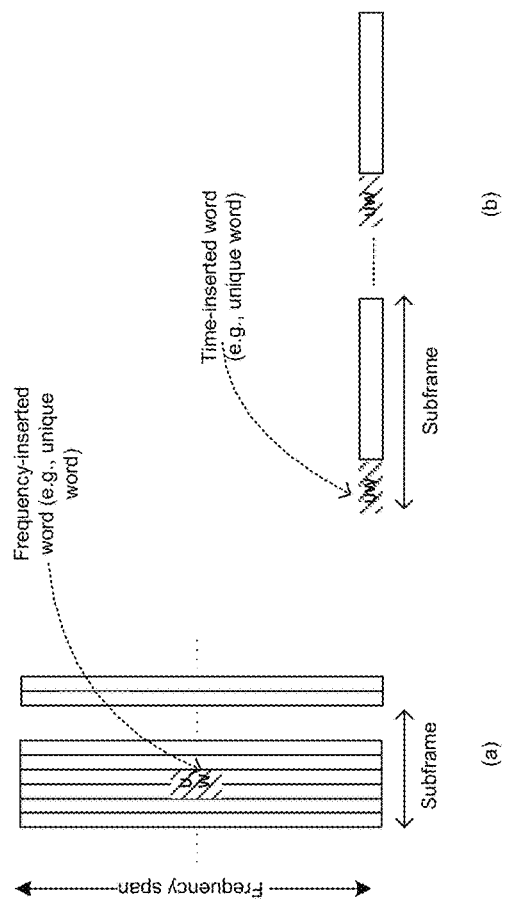
FIG. 15 depicts an example beam-group identification through a waveform.

Beam-group identification may be carried out by examining a feature or a property of an employed waveform. An example of such property may include a word (e.g., a unique word) that may be carried by a waveform. As demonstrated in FIG. 15, a unique word may be defined in a frequency or the time domain. A unique word may be already in use for other receiver purposes such as synchronization or channel tracking. The choice of the unique word may be different per beam to allow beam identification. In an example where the unique word is based on a ZC sequence, a choice of parameters such as cyclic shift, root sequence may be used to carry beam identification. The transmission of the unique word for beam identification may be kept at a symbol level or at a lower rate. For example, the identification may be carried by a single unique word or based on multiple different unique words spread over several symbols.

The location of the transmitted unique word may be fixed (e.g., always fixed) or configured. In a DL scenario, the information about a location of the unique word may be available, for example, semi-statically or through initial RRC signalling.

Figure 16:
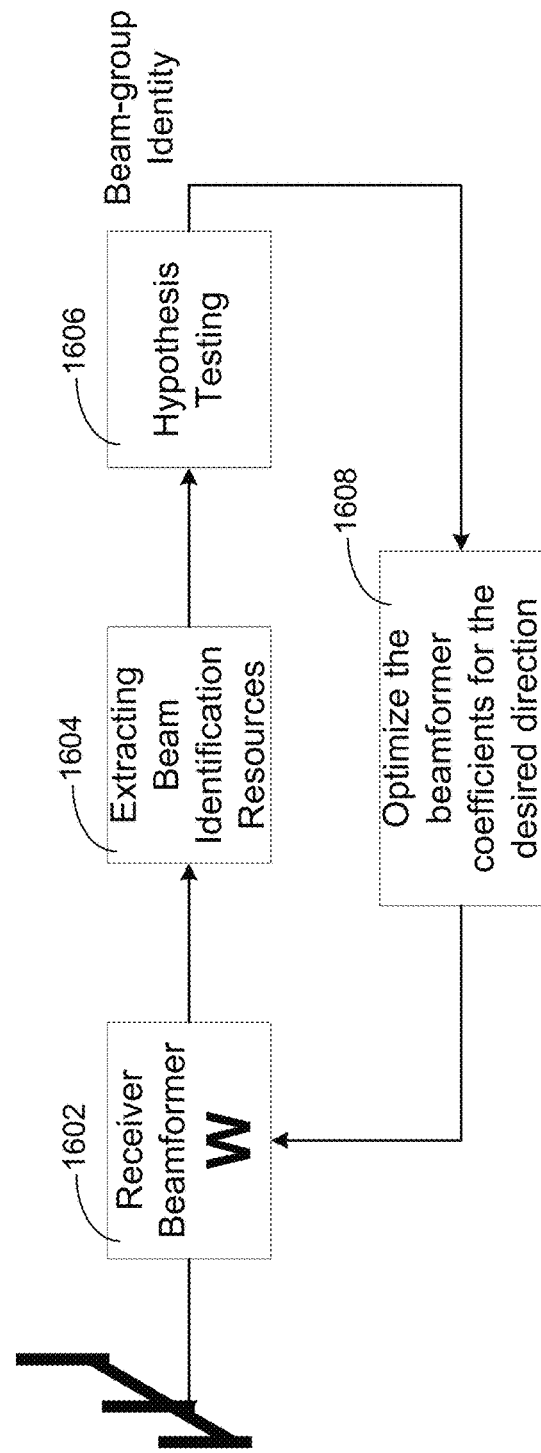
FIG. 16 depicts an example a process for beam-group identification.

For a (e.g., each) beam-group, the location of the unique word may have the same configuration as other beams or may be configured independent of others. The configuration information may include: size of the unique word, as different beams may be configured with different unique word length, the multitude of unique words used for the beam identification, resource location definition of the unique word in a time/frequency grid, and/or frame, subframe and/or symbol periodicity and time off-set of transmission(s) of the block(s) for puncturing. FIG. 16 shows a general procedure of a beam-group identification process. For example, at 1602, the WTRU may be configured with the basic parameters related to the beam identification mechanism, e.g., resource location, size, timing, pool of the potential secondary parameters such as ZC cyclic shift, etc. At 1604, the WTRU may extract the resources related to the beam identification. At 1606, the WTRU may perform hypothesis testing to determine the identity of the transmitted beams. At 1608, the WTRU may adjust the WTRU's receive beamforming, for example, according to a direction of a transmitted DL beam carrying the desired identity.

Based on reception of beam group information (e.g., beam grouping information), the WTRU may measure beam related information (e.g., execute the beam related information measurement). The WTRU may report the measured beam related information back to the TRP, for example, via group-based reporting. Group-based beam reporting (e.g., group-based reporting) may include reporting one or more of the following beam measurement information (BMI) or beam related information (BRI): reference signal received power (RSRP), reference signal received quality (RSRQ), channel state information (CSI), beam index, beam group index, channel quality indicator (CQI), RI, and CSI resource index (CRI) associated with beam information. The one or more of the BMI or BRI may be included in a group-based report. The one or more of the BMI or BRI to be reported by the WTRU may be pre-specified, configured by a RRC message, or dynamically signalled by L1/L2 signalling such as MAC CE or NR-(e)PDCCH/NR-DCI. The WTRU may report BMI or BRI in a periodic or aperiodic manner, for example, as configured by a TRP or a gNB. Event-based or aperiodic beam reporting may be triggered by the network or the WTRU(s). For example, one or more new beam candidates may be detected to have better beam quality than the serving beam and/or reported by the WTRU. RSRP, RSRQ may be interchangeably used as L1-RSRP and L1-RSRQ respectively.

Group-based beam reporting may reduce the amount of WTRU reporting (e.g., on BRI), for example, by reducing overhead associated with the reporting. Group-based beam reporting may be performed in one or any combination of the following approaches.

For example in an approach for group-based beam reporting, the WTRU may report the best BRI (e.g., largest L1-RSRP) for a component beam in a beam group. In an example, some or all beams may be grouped into a total number of beam groups (e.g., N). The WTRU may report the best RSRP/CSI for a component beam in each of M beam groups and the associated beam index for the component beam in each of the M beam groups (e.g., M<=total number of beam groups N). M and/or N may be pre-configured, semi-dynamically signalled, and/or or dynamically signalled. For example, M and/or N may be determined based on one or more of the following. M and/or N may be configured by the network. M and/or N may be determined based on WTRU capability such as the number of beams the WTRU can simultaneously receive. M and N may be selected by the WTRU.

The WTRU may report the J best BRI (e.g., top J BRI or largest J L1-RSRP) for J component beams in a beam group, where J>=1. The WTRU may report associated beam IDs in a pre-specified or configured ordering according to J best RSRP/CQI values (e.g., J best or largest L1-RSRP and/or J best wideband CQI values). For example, the pre-specified or configured ordering may be in a ascending or descending order according to the RSRP and/or CQI values).

In an approach for group-based beam reporting, the WTRU may report the average or mean or medium BRI for a component beam in a beam group. For example, some or all beams may be grouped into a total number of beam groups (e.g., N). The WTRU may report the average or mean or medium RSRP/CSI for a component beam. The WTRU may report the associated beam index of the component beam. In an example, the WTRU may report the average or mean or medium RSRP/CSI for a component beam in each of M beam groups (M<=total number of beam groups N) and the associated beam index of the component beam in each of M beam groups. M and N may be configured by network via RRC messaging or dynamically signalled in NR-(e)PDCCH/NR-DCI field. For example, N may be configured based on WTRU capability. M may be dynamically signalled in NR-DCI for group-based beam reporting. In some instances, M may be the same for each beam reporting. In some instances, M may be different for each beam reporting.

In an approach for group-based beam reporting, the WTRU may report BRI for a reference or representative beam, for example, the average BRI for a beam group, and a differential BRI(s) for the rest beam(s) within the same beam group. The differential BRI may be pre-defined, specified, or configured in a certain quantization level. The quantization level may be referred to as the differential beam reporting resolution. The reported BRI may include RSRP. The reference BRI may include the reference RSRP, which may include one or more of the max RSRP, the largest RSRP, the best RSRP, the worst RSRP, the average RSRP or the medium RSRP of a reported beam group. The differential RSRP may indicate the RSRP of an (e.g., each) individual beam within the same beam group with respect to the reference RSRP. The reference RSRP may be reported by the WTRU and/or may be determined or configured by the TRP based on a rule. The rule may be pre-defined or specified or configured or signalled. For different reference RSRP, same or different differential beam reporting resolutions (e.g., or stepping size of differential quantization) may be used, for example, based on a trade-off between signalling overhead and reporting accuracy for beam management. For example, to reduce signalling overhead, a large quantization level or a low resolution may be used. A small quantization level or high resolution may be used if accurate beam reporting is desired. The differential beam reporting resolution may be specified, configured (e.g., via RRC message or signalled in DCI). The differential beam reporting resolution may be determined by the WTRU and/or reported in beam reporting.

The differential beam reporting per beam group may be extended to some or all beam groups. For example, the reference RSRP may be selected as one of the max RSRP, the largest RSRP, the best RSRP, the worst RSRP, the average RSRP or the medium RSRP of some or all reported beam groups. The differential RSRP may indicate the RSRP of an (e.g., each) individual beam for the reported beam groups with respect to the reference RSRP defined for the reported beam groups. The reference RSRP may be reported once for some or all reported beam groups as common beam-group reporting (e.g., to further reduce the signalling overhead). The reported beam groups may be associated via the common beam-group reporting. The reference RSRP may be reported on a per beam group basis. The reference RSRP may be a specified default value or configured by gNB. Bit-width for the reference RSRP and the differential RSRP may be pre-specified or configured as the same or different values. For beam-group based different beam reporting, the reference L1-RSRP may be reported with the same bit-width for different beam groups, while the differential L1-RSRP may be reported with same or different bit-width for different beam groups which may depend on the number of beams for different beam groups if different stepping size of differential quantization is used for different beam groups. When the number of beam group is equal or configured to 1, beam-group based differential beam reporting above may be used for non-beam-group differential beam reporting for multiple beams (e.g. N2 beams within 1 beam group): the reference L1-RSRP may be reported with a first bit-width (e.g., X1 bits=7 bits), and the differential L1-RSRP may be reported with a second bit-width (e.g., X2 bits=4 bits).

For example, a beam group may include 12 beams (e.g., narrow beams). The reference RSRP may be the average RSRP/CQI of the beam group. The reference RSRP may be the average RSRP/CQI over the 12 beams. Beam ID(s) for the beam(s) whose RSRP/CQI is closest to the average RSRP/CQI, and the differential RSRP/CQI with respect to the reference RSRP (e.g., the average RSRP/CQI) may be reported using various techniques.

With an example, the total number of beams with a beam group may be T. The number of sub-groups within the beam group may be integer (T/B_delta) which denotes as L. L may be configured or dynamically signalled from gNB/TRP depending on a signalling overhead requirement(s). B_delta may denote the quantization level of a sub-group(s) with the beam group. In this example, T=12 beams, B_delta=4 beams, then L=12/4=3 sub-groups. The group-based beam report may include the average RSRP/CQI and beam ID(s) associated with beam(s) which has the closest RSRP/CQI value(s) to the average RSRP/CQI. The group-based beam report may include an average RSRP/CQI(s) for 3 subgroups and potentially associated sub-group beam ID(s).

With an example technique, the differential RSRP/CQIs with regards to the reference RSRP/CQI for a certain number of beams within a beam group may be reported. The group-based beam report may include the average RSRP/CQI value and the associated beam ID for the beam which has the closest RSRP/CQI value to the average RSRP/CQI. The group-based beam report may include differential RSRP/CQI(s) with regards to the average RSRP/CQI for a certain number (e.g., 6) beams and beam IDs associated with the beams (e.g., the 6 beams). The differential RSRP/CQIs and/or the beam IDs may be reported in a prespecified or configured order, for example, an ascending or descending order in terms of differential RSRP/CQI values.

With an example technique, the differential RSRP/CQI with regards to the reference RSRP/CQI for one or more beams (e.g., each beam) within a beam group may be reported. The group-based beam report may include the average RSRP/CQI and a beam ID(s) associated with a beam(s) that may have the closest RSRP/CQI value to the average RSRP/CQI. The group-based beam report may include a number of differential RSRP/CQI(s) for the one or more beams (e.g., each beam) and beam IDs associated with the one or more beams (e.g., each beam or 12 beams in this example). The differential RSRP/CQIs and/or the beam IDs may be reported in a prespecified or configured order, for example, an ascending or descending order in terms of differential RSRP/CQI values.

The differential beam reporting techniques described herein may be used for per-beam based reporting over time. For example, the reference RSRP may be a RSRP reported at a time (for example, at the first time when RSRP is reported), and the differential RSRP may be the RSRP reported at a later time with respect to the reference RSRP (e.g., at the second time).

In an approach for group-based beam reporting, the WTRU may dynamically report BRI for beams (e.g., all beams) in K of M beam groups (M<=total number of beam groups N) and the best BRI in (M−K) of M beam groups (M<=total number of beam groups N). K may be dynamically indicated or signalled to the WTRU by DCI. For example, when the number of beams for each group, denoted as as $N_m$, is configured to be 1, this approach for group-based beam reporting may become per-beam basis reporting (e.g., beam-based reporting, wherein group-based reporting turns off).

In an approach for group-based beam reporting, the WTRU may be configured to report BRI for all beams for each of M beam groups. This approach for group-based beam reporting may be associated with per-beam basis reporting. This approach for group-based beam reporting may be used during the initialization of beam acquisition of TRP Tx beam/WTRU Rx beam. This approach for group-based beam reporting may be aperiodically triggered by network or the WTRU. This approach for group-based beam reporting may be configured in a periodical manner, for example, with long periodicity to maintain the beam group or keep the beam group updated and tracked accurately.

In an approach for group-based beam reporting, the WTRU may report the worst BRI for a component beam(s) in a beam group. For example, the WTRU may report the best RSRP/CSI for a component beam(s) and a beam index associated with the component beam(s) in each of M beam groups (M<=total number of beam groups N). M and/or N may be configured or dynamically signalled in an NR-(e) PDCCH/NR-DCI field.

The measurement and reporting approaches discussed herein may be applicable to Quasi Co-located (QCL) beams at the TRP or Quasi co-Beam (QCB) beams at a WTRU (e.g., any of the WTRUs).

Reduced group-based beam report may be periodic or triggered aperiodically by network or a WTRU. The WTRU may send group-based beam reporting via UL channels such as NR-PUCCH or NR-PUSCH. If a large amount of group-based reporting is performed (e.g., beam-based full WTRU report), the group-based reporting may be carried over NR-PUSCH. Data and group-based beam report may be multiplexed. Data and group-based beam report may be joint-coded. Reduced amount of group-based WTRU report (e.g., a reduced level of reporting compared to a level of reporting associated with beam-based reporting) may be carried via NR-PUCCH. Various types of periodic NR-PUCCH feedback for BRI may be provided using any of the group-based beam reporting methods described herein.

A beam group may be defined by the TRP or the WTRU. A beam group may be defined based on QCL or QCB beams. A beam group may elect a representative beam or beam-pair (e.g., an anchor beam/beam-pair) on which measurement and/or reporting may be performed. A beam-measurement reference signal (BRS) may be transmitted on the representative beam(s)/beam-pair(s). Initial access signals and procedures such as synchronization, system information acquisition using the NR-PBCH and NR-RACH may occur on the representative beam(s)/beam-pair(s). The approaches used for group-based reporting and/or beam-based reporting discussed herein may be used. For example, the approach for group-based beam reporting where the WTRU reports BRI for a reference or representative beam and a differential BRI(s) for the rest beam(s) within the same beam group may be used. Additional differential information compared to the representative beam/beam-pair(s) may be transmitted.

The representative beam or beam-pair(s) may be selected using one or more of the following approaches.

In an approach for selecting the representative beam or beam-pair(s), a (e.g., one) beam/beam-pair(s) may be selected as the representative beam/beam-pair(s). This beam/beam-pair may be statically, semi-statically, or dynamically selected. This beam/beam-pair may be standard specified (e.g., pre-specified or pre-configured). For example, the representative beam or beam-pair(s) may be specified as the beam/beam-pair with a BMI/BRI element (e.g., value) closest to the mean/median/mode of the BMI/BRI elements (e.g., all of the BMI/BRI elements) of the beam/beam-pair(s).

In an approach for selecting the representative beam or beam-pair(s), the beam/beam-pair(s) in the beam group (e.g., all beam/beam-pair(s) in the beam group) may be eligible to be selected as the representative beam/beam-pair(s). The specific beam/beam-pair(s) may be selected based on one or more pre-defined rules. For example, random selection and/or cyclic selection (e.g., as used as pre-defined rules) may be performed.

In an approach for selecting the representative beam or beam-pair(s), for example, a transmit beam (e.g., one or all transmit beams) may be selected as the representative transmit beam with measurements provided on the receive beams. In some instances, only the transmit beams may be selected as the representative transmit beam with measurements provided on all of the receive beams. In an example, one or more of the following may be performed. A (e.g., one) beam may be selected as the representative beam. A receiver that has more than one receive beam may then send the measurements for some (e.g., all) the receive beams for that representative beam. If the receiver is able to form the receive beams (e.g., at the same time), then it may measure on some (e.g., all) the receive beams and/or send the feedback. If the receiver is able to form the receive beams (e.g., one at a time), then the receiver may feed back (e.g., only feed back) the current beam. The transmitter may send (e.g., have to send) a measurement signal on the transmit beam multiple times.

In an example, if the transmitter is able to form multiple transmit beams (e.g., at the same time), it may do this simultaneously. Measurement signals may (e.g., have to) be orthogonal or separable from each beam. For example, it may form a beam on each polarization and/or send the information simultaneously.

Figure 17:
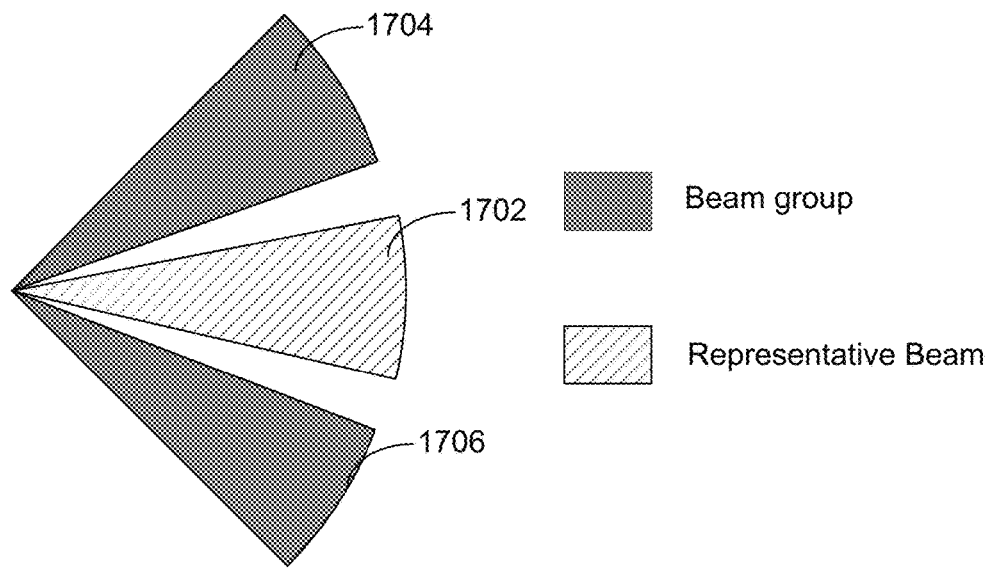
FIG. 17 depicts an example beam group with a representative beam(s).
Figure 18:
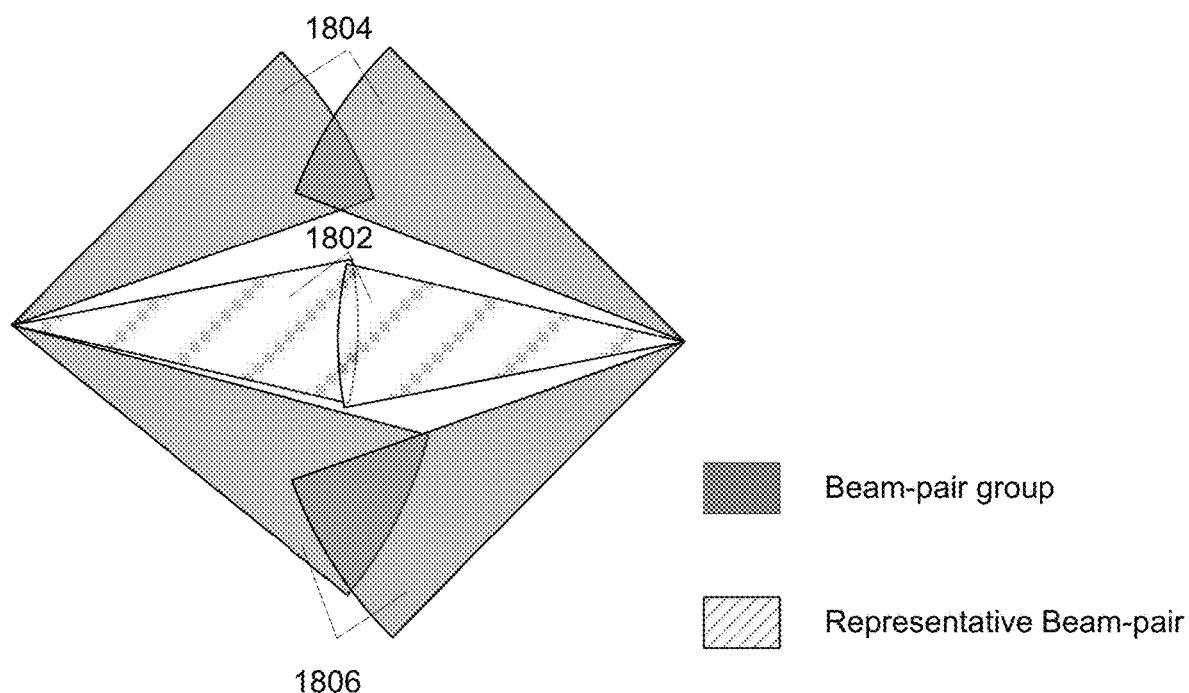
FIG. 18 depicts an example beam-pair group with a representative beam-pair(s).

This approach for selecting the representative beam or beam-pair(s) may be performed simultaneously if the WTRU is capable of forming multiple receive beams simultaneously. This approach for selecting the representative beam or beam-pair(s) may be performed sequentially if the WTRU is not capable of forming the multiple receive beams simultaneously. FIG. 17 depicts an example beam group with representative beam(s). As shown in FIG. 17, the beam group may include beam 1702, beam 1704, and beam 1706. Beam 1702 may be selected as the representative beam. FIG. 18 depicts an example beam-pair group with representative beam-pair(s). As shown in FIG. 18, the beam group may include beam pair 1802, beam pair 1804, and beam pair 1806. Beam pair 1802 may be selected as the representative beam pair.

Figure 19:
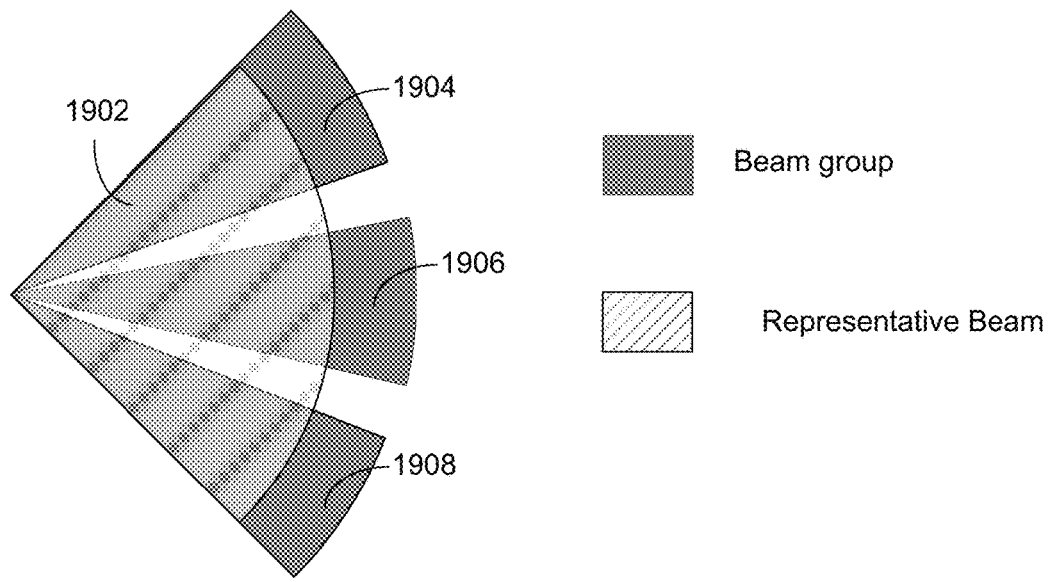
FIG. 19 depicts an example composite beam.

In an approach for selecting the representative beam or beam-pair(s), a composite beam/beam-pair representative of the beam/beam-pairs in a beam group may serve as the representative beam/beam-pair. An exemplary composite representative beam is illustrated in FIG. 19. As shown in FIG. 19, the beam group may include beam 1904, beam 1906, and beam 1908. A composite beam 1902 may be selected as the representative beam. For example, the composite beam 1902 may include beams 1904-1908. As shown in FIG. 19, the composite beam 1902 may have a wider beam width than the beams in the beam group such as beam 1904. In one example, the composite/representative beam may be a beam that has a beamwidth that spans the union of the beam widths of the beams it represents. In one example, the composite/representative beam may be a beam that spans all the WTRUs that may be connected to the beams it represents. The wider beam width may result in beamforming gain for power measurements such as SINR and CQI. The change/difference in beamforming gain for power measurements such as SINR and CQI due to the wider beam width of the representative beam may be compensated for. For example, as the beamwidth increases, the gain of a resulting sector may be different (e.g., less than) the gains of the beams it represents. As such, if measurements are made based on the wider beam, some transformation on the estimated metrics that are measured may (e.g., have to) be performed.

Figure 20:
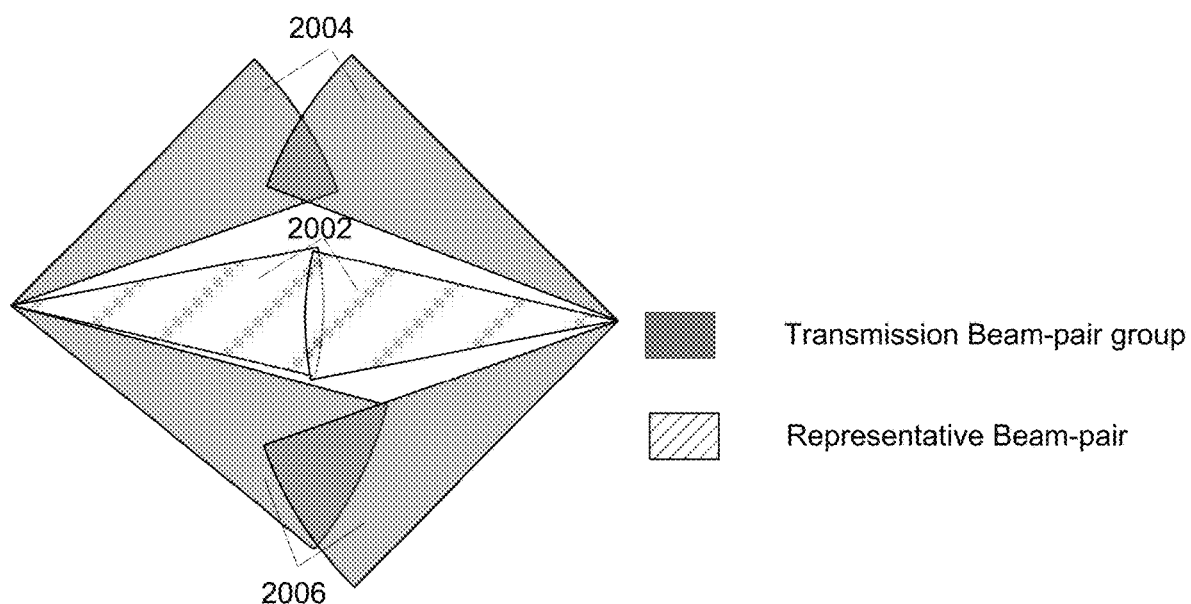
FIG. 20 depicts an example of a transmission beam-pair group(s).
Figure 21:
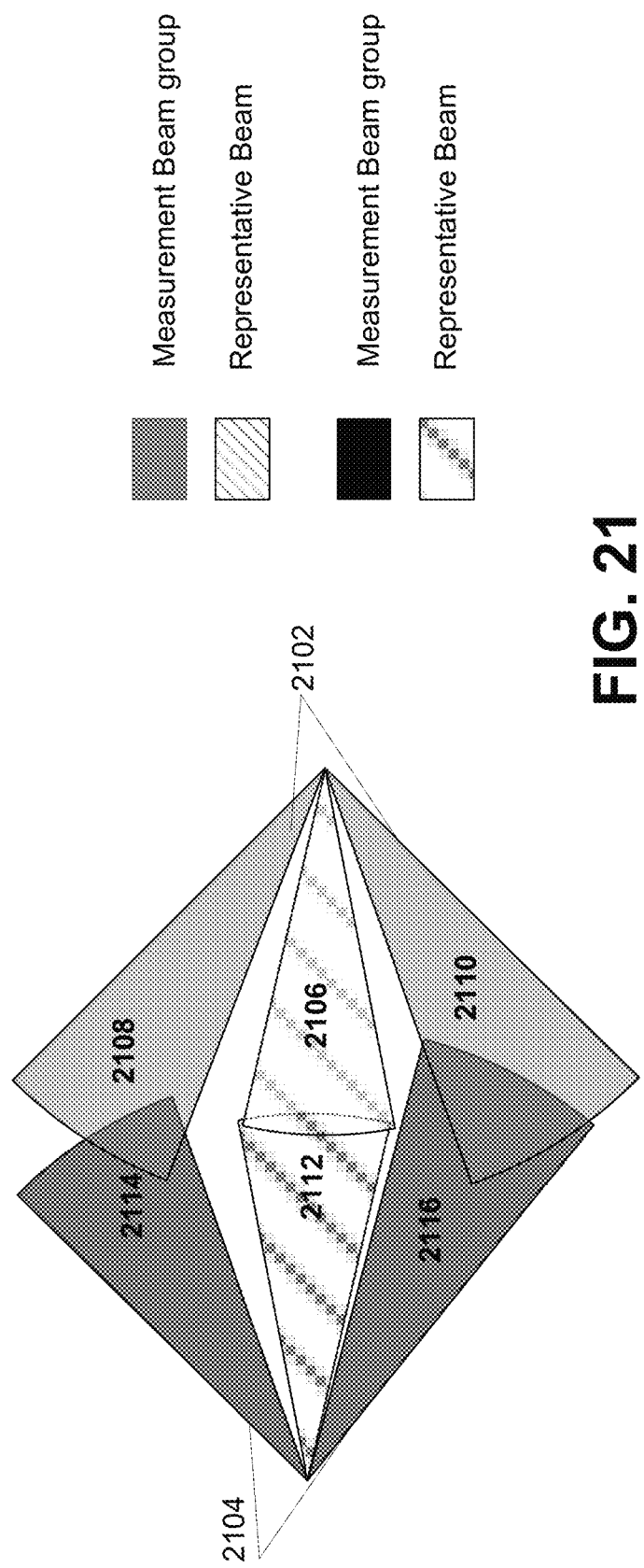
FIG. 21 depicts an example of a measurement beam group(s).

In an approach for selecting the representative beam or beam-pair(s), a measurement beam group may be defined separately from a transmission beam-pair group. As an example, a measurement beam group may be defined as including a specific set of transmit beams or receive beams. A transmission beam-pair group may include (e.g., be specified to include) a set of transmit-receive beam pairs. Translation between the measurement beam group and the transmission beam-pair groups may be performed in various ways. In a translation, measurements (e.g., any measurements) made on the measurement beam group may be (e.g., have to be) modified/translated/processed to make them applicable to the transmission beam group. For example, difference between the gains of the two sets of beams may be looked at and/or changes may be made based on the difference.

may A distinction (e.g., the separate definition for the measurement beam group and the transmission beam-pair group) is illustrated in FIGS. 20 and 21. FIG. 20 depicts an example of a transmission beam-pair group(s). FIG. 21 depicts an example of a measurement beam group(s). As shown in FIG. 20, a transmission beam-pair group may be define. The transmission beam-pair group may include transmission beam-pair 2002, transmission beam-pair 2004, and transmission beam-pair 2006. Transmission beam-pair 2002 may be selected as the representative transmission beam-pair. A beam-pair may include a pair of transmit and receive beams. As shown in FIG. 21, measurement beam groups may be defined separately from the transmission beam-pair group in FIG. 20. The measurement beam group 2102 may include beam RX 2106, beam 2108, and beam 2110. Beam 2106 may be the representative beam of the measurement beam group 2102. The measurement beam group 2104 may include beam 2112 beam 2114, and beam 2116. TX beam 2112 may be the representative beam of the measurement beam group 2104.

Some elements (e.g. RI) of the BMI/BRI may be same for the beam/beam-pair(s) in a beam-group, while some elements (e.g. the SINR) of the BMI/BRI may differ for different beam/beam-pair(s) in the group. A process may be initiated in which the different elements of the BMI/BRI for the constituent beam/beam-pairs(s) may be calibrated according to an BMI/BRI element of the representative beam/beam-pair(s). The calibration may facilitate (e.g., enable) an estimation of a BMI/BRI element value (e.g., the correct BMI/BRI element value), for example, based on a reported value for the BMI/BRI element of the representative beam/beam-pairs(s). For example, if the beam group measurement reports a value of X, then beam 1's measurement may be X+b1, beam 2's measurement may be X+b2, etc where b1, b2 etc may be the calibrated values.

The process may be used when the members (e.g., the constituent beam/beam-pairs(s)) of the beam group have different beam-widths. The process may be used when the members of the beam group may be directed on channel clusters that suffer from attenuation (e.g., greater/less attenuation). As an example, the WTRU or gNB may identify the representative beam/beam-pair(s), and a receiving node (e.g., the WTRU or gNB) may feed back/feed forward information relative to the representative beam/beam-pair(s) (e.g., differential SINR or CQI).

RSRP (e.g., L1-RSRP) reporting may be implemented for multiple beams. A WTRU may measure and/or report one or more measurement results for one or more downlink signals. For example, the WTRU may be configured, indicated, and/or triggered to measure and/or report the measurement results. A (e.g., each) downlink signal may be associated with a beam. The measurement results may be one (e.g., at least one) or more of a channel quality indicator (CQI), a reference signal received power (RSRP), or a beam reference signal indicator.

RSRP may be categorized to one or more types and used in one or more of the following ways. In an example, a first type RSRP may be used if the RSRP is measured in a first time window (e.g., a time window configured or used in a higher layer such as a sliding time window) and a second type RSRP may be used if the RSRP is measured in a second time window (e.g., a time window configured or used in a physical layer). In an example, a first type RSRP may be used if the RSRP is measured in a time window, while the second type RSRP may be used if the RSRP is measured at a time instance where the measurement reference signal is transmitted. In an example, a first type RSRP may be associated with a time window that may be configured or determined via higher layer, and a second type RSRP may be associated with a time window that may be configured or determined via L1 signalling (e.g., DCI). In an example, the first type RSRP may be referred to as L3-RSRP and the second type RSRP may be referred to as L1-RSR.

In an example, the measurement results may include a beam reference signal indicator. For example, one or more beam reference signals may be configured or used, and a WTRU may report a preferred beam reference signal index.

A WTRU may be configured, indicated, and/or triggered to report one or more measurement results (e.g., L1-RSRP). A (e.g., each) measurement result may be associated with a beam reference signal. A beam reference signal as used herein may be used interchangeably with channel state information reference signal (CSI-RS), demodulation reference signal (DM-RS), phase tracking reference (PTRS), synchronization signal block (SS block), and SS/PBCH block. One or more of following may apply.

A WTRU may be configured with the number of beams and/or the number of measurement results for the reporting. For example, a WTRU may be indicated via higher layer signalling, L1 signalling (e.g., DCI) for the reporting of one or more measurement results. A DCI that is used for aperiodic CSI reporting triggering may be used to indicate the number of beams to report, wherein beams may be interchangeably used with the measurement results, reference signals, RSRP, CQI, or L1-RSRP.

One or more RNTI may be used to indicate the number of beams to report when a WTRU is triggered, for example, via aperiodic CSI reporting or semi-persistent CSI reporting with a DCI. A first RNTI may be used to mask the CRC of the associated DCI if the number of beams to report is N1. A second RNTI may be used to mask the CRC of the associated DCI if the number of beams to report is N2. For example, N1 may be a fixed or predefined number (e.g., N1=1), and N2 may be a number configured via higher layer signalling (e.g., N2>1)).

A WTRU may be configured, indicated, and/or triggered to report a single beam among a plurality of beams. The WTRU may determine the single beam to report based on one or more of following: a WTRU may determine a beam (e.g., a beam reference signal) which has a highest RSRP value. For example, a WTRU may measure RSRP on one or more beams, compare the measured RSRP values, and determine the beam with a highest measured RSRP value(s). The WTRU may report the beam index (e.g., a beam reference signal index) and the measurement value (e.g., L1-RSRP) associated with the beam index. The beam that the WTRU selected or determined for single beam reporting may be referred to as one or more of a preferred beam, a preferred beam reference signal, a selected beam, or a selected beam reference signal.

A WTRU may be configured, indicated, and/or triggered to report more than one beam within a plurality of beams using various approaches. One or more of following may apply: a WTRU may report N2 beams; and/or a WTRU may report N2 beams and the bit-width for each beam measurement value.

In an approach for reporting more than one beam within a plurality of beams, a WTRU may report N2 beams (e.g., N2 beam IDs and N2 beam measurement values such as N2 RSRP or N2 L1-RSRP) in one reporting instance, wherein N2>1 and N2 is no more than the maximal number of configured Tx beams to be reported in one reporting instance (e.g., N_max). N_max may be less than the maximal number of configured Tx beams for beam measurement. N2 beam measurement values may be reported via an uplink control channel (e.g., an individual uplink control channel). For example, a WTRU may be configured with N2 physical control uplink channel (PUCCH) resources. One or more of the PUCCH resources (e.g., each PUCCH resource) may be used to report a beam measurement value. The one or more uplink control channels for reporting of N2 beam measurement values may be multiplexed in time. For example, N2 consecutive PUCCH resources in time may be used for reporting N2 beam measurement values. A transmission order (e.g., of the N2 consecutive PUCCH resources) may be based on the measurement values. For example, the PUCCH resource(s) associated with the highest measurement value may be transmitted first and the PUCCH resource(s) associated with the other measurement values according to the other measurement values. The PUCCH resource(s) associated with the lowest measurement value may be transmitted first and the PUCCH resource(s) associated with the other measurement values according to the other measurement values. N2 beam measurement values may be reported via a physical uplink shared data channel (PUSCH), and the N2 beam measurement values may be jointly coded or separately coded.

In an approach for reporting more than one beam within a plurality of beams, a WTRU may report N2 beams or beam IDs, and the bit-width for a (e.g., each) beam measurement value. The bit-width for a (e.g., each) beam measurement value may be determined based on one (e.g., at least one) or more of the following. The bit-width for a (e.g., each) beam measurement value may be determined based on uplink channel used for N2 beam reporting. For example, a first bit-width (e.g., X1 bits) may be used for reporting N2 measurement values if a first uplink channel (e.g., PUSCH) is used. A second bit-width (e.g., X2 bits) may be used for reporting N2 measurement values if a second uplink channel (e.g., PUCCH) is used.

The bit-width for a (e.g., each) beam measurement value may be determined based on TTI length of the uplink channel used for N2 beam reporting. For example, a first bit-width (e.g., X1 bits) may be used if a first TTI length (e.g., 1 ms) is used for the associated or corresponding uplink channel. A second bit-width (e.g., X2 bits) may be used if a second TTI length (e.g., 0.5 ms) is used for the associated or corresponding uplink channel. The TTI length may be determined based on numerology (e.g., subcarrier spacing) and/or the number of symbols used for a TTI.

The bit-width for a (e.g., each) beam measurement value may be determined based on the number of beams. For example, if N2 is greater than a predefined threshold, a first bit-width (e.g., X1 bits) may be used. If N2 is less than or equal to a predefined threshold, a second bit-width (e.g., X2 bits) may be used.

The bit-width for a (e.g., each) beam measurement value may be determined based on most significant bits (MSB) or least significant bits (LSB). For example, when X1>X2, the X2 bits may be most significant bits (MSB) of X1 or least significant bits (LSB) of X1, or vice versa; Xi may be the MSB or the LSB.

The bit-width for a (e.g., each) beam measurement value may be determined based on an explicit indication. The explicit indication may be transmitted or received via a higher layer signalling or a L1 signalling (e.g., DCI). For example, when L1 signalling is used, the L1 signalling that indicates or triggers N2 beam reporting may include the bit-width information.

In an approach for reporting more than one beam within a plurality of beams, a WTRU may report N2 beams, and the bit-width for a (e.g., each) beam measurement value. The bit-width for a (e.g., each) beam measurement value may be determined based on one (e.g., at least one) or more of following. The first beam which may be a highest measurement value may be reported with a first bit-width (e.g., X1 bits). The measurement value of the first beam may be reported in an uplink channel or uplink resource that is associated with higher reliability than other uplink channel(s) or uplink resource(s). For example, if PUCCH and PUSCH are used, the measurement value of the first beam may be reported in PUCCH while the rest of measurement values may be reported in PUSCH. In another example, the measurement value of the first beam may be reported in the uplink resources which may be closer to a reference signal location (e.g., symbol next to the reference signal symbol. The second beam or the rest of beams may be reported with a second bit-width (e.g., X2 bits). In case of reporting differential L1-RSRP for multiple beams (e.g. N2 beams), the reference L1-RSRP may be reported with a first bit-width (e.g., X1 bits=7 bits), and the differential L1-RSRP may be reported with a second bit-width (e.g., X2 bits=4 bits).

A WTRU may be configured, indicated, and/or triggered to report one or more beam groups. A maximum number of beams to report (e.g., N2) may be determined based on the number of beam groups for which a WTRU may report. For example, a WTRU may report a receiver beam group for which a WTRU reports one or more measurement values for Tx beams, and the maximum number of beams to report which are associated with a beam group may be determined based on the number of beam groups. One or more of following may apply. One or more threshold values for the number of beam groups may be used. For example, a first maximum number of beams (e.g., N2_max_1; N2 N2_max_1) may be used if the number of beam groups is greater than a predefined threshold. A second maximum number of beams (e.g., N2_max_2; N2 N2_max_1) may be used if the number of beam groups is equal to or smaller than a predefined threshold. A total number of beams to report (e.g., the total number of beams which may be reported by a WTRU simultaneously) for one or more beam groups may be limited to a certain number. The limiting number may be configured, pre-determined, indicated, and/or pre-specified. For example, the total number of beams may be N2. If a WTRU reports one or more beams for a single beam group, the WTRU may report N2 beams for the determined beam group. If the WTRU reports one or more beams for N2 beam groups, the WTRU may report a single beam for each beam group.

Beam reporting may be used or configured in various approaches or alternatives. In an approach or alternative, the WTRU may report information about Tx beam(s) (e.g., a group of Tx beams) associated with the TRP that can be received using a selected WTRU Rx beam set(s). A Rx beam set may include a set of WTRU Rx beams for receiving a DL signal. The Rx beam set may be constructed in various ways. For example, a (e.g., each) Rx beam in a WTRU Rx beam set may correspond to a selected Rx beam in a (e.g., each) antenna panel. For a WTRU associated with more than one WTRU Rx beam sets, the WTRU may report Tx Beam(s) associated with the TRP (e.g., the group of Tx beams) and/or an identifier of the associated WTRU Rx beam set per reported TX beam. In an approach or alternative, the WTRU may report information about TRP Tx beam(s) on a group basis (e.g., a WTRU antenna group basis). For example, the WTRU may report one or more groups with reporting a (e.g., one) Tx beam for a (e.g., each) group. A WTRU antenna group may include a receive WTRU antenna panel or subarray. For a WTRU associated with more than one WTRU antenna groups, the WTRU may report Tx beam(s) associated with a TRP(s) and/or an identifier of the associated WTRU antenna group per reported TX beam.

A TRP (or gNB) and a WTRU may transmit or receive different Tx and Rx beams from a same antenna group(s). A TRP (or gNB) and a WTRU may transmit or receive different Tx and Rx beams from a different antenna group(s). TRP beams from the same antenna group may be more correlated with similar angles of departure (AoD's) and/or zenith angles of departure (ZoD's). TRP beams from different antenna groups may be more uncorrelated. Different antenna groups may include one or more of different antenna panels or sub-arrays, same antenna panel(s) or sub-array(s) with using different polarizations, and/or same antenna panel(s) or sub-array(s) with most uncorrelated angles of arrival (AoA's) and zenith angles of arrival (ZoA's).

Tx or Rx beam sets may include beams that may be (e.g., tend to be) correlated, for example, beams from the same antenna group as described herein. Tx or Rx beam sets may include beams that may be (e.g., tend to be) uncorrelated, for example, beams from different antenna groups as described herein.

A WTRU Rx beam set may receive gNB or TRP Tx beams. The WTRU Rx beam set may receive gNB or TRP Tx beams simultaneously, if Tx beams tend to be uncorrelated (e.g., as described herein). The WTRU Rx beam set may receive gNB or TRP Tx beams simultaneously, if Tx beams tend to be correlated, but the WTRU Rx beam set tends to be uncorrelated. The WTRU Rx beam set may receive gNB or TRP Tx beams non-simultaneously, if the WTRU Rx beam set tends to be correlated, e.g. from a same antenna group.

The WTRU may report some (e.g., all) unique, uncorrelated Tx and Rx beam set IDs and/or the Tx and Rx beam IDs associated with Tx and Rx beams that are used. The WTRU may report part of uncorrelated, Tx and Rx beam set IDs, and the Tx and Rx beam IDs used based on certain criterion that include one or more of a receive power metric exceeding certain threshold, a correlation being less than a threshold, or the like.

There may be up to 256 or more=simultaneous beams belonging to one or more TRP's, one or more WTRU groups, and one or more associated antenna panels. An approach may be used for reporting the TRP Tx beam reception for each WTRU Rx beam and/or beam sets while keeping the approach efficient.

A beam, beam set, or group of beams may be associated with (e.g., designated as) a control beam, for example, NR-PUCCH. A control beam designation may be dynamic, semi-static, or in response to a request from a TRP or a WTRU. A control beam (e.g., NR-PUCCH) may be used to send control information (e.g., only send control information). The control information may provide an indication of the WTRU Rx beam set that is configured for a WTRU response in one or more of a sector, a beam set, or a beam group. The indication of the WTRU Rx beam set may be configured during an initialization and/or as a part of an association with the network.

A WTRU antenna group may be associated with a single and/or multiple Rx beam sets. A WTRU antenna group may be associated with multiple Rx beam sets. The WTRU antenna group may be associated with one or more antenna panels. A WTRU antenna group may have properties that indicate (e.g., define) the WTRU antenna group's capability for supporting a WTRU report of acceptable TRP Tx beams. The properties may include one or more of the number of antenna elements, polarization type(s), AoD/AoA, frequency/time resource(s), reciprocity, or the like. A WTRU report may be sent for WTRU antenna groups based on the properties of the WTRU antenna groups. For example, a WTRU report may be sent for the WTRU antenna groups that have a particular property or a specific set of properties. For example, a WTRU report may be configured to report (e.g., only report) information for those WTRU's that have two or more panels.

A WTRU may provide information related to coverage of either or both of the TRP Tx beam and the WTRU Rx Beam. A WTRU report may include information on the beams having a minimal coverage. A beam, beam set, or group of beams, may be defined by the coverage that the beam, the beam set, or the group of beams achieve. Coverage may be determined based on factors including one or more of the number of TRPs and/or WTRU beams that are received with an acceptable quality, beam and/or sector width, beam overlap, transmission power, and/or resource bandwidth.

A WTRU report may report the TX beams starting with the a beam(s) that has the largest coverage, and then a beam(s) that has the next largest coverage, finishing with a beam(s) that has the least acceptable coverage. TABLE 7 provides an example of a measurement table with measured reference signal received power (RSRP) values. On the WTRU's beam measurement report, all or some of the table contents may be reported, for example, based on Rx beam set and/or Rx antenna group as described herein.

The report may be based on Rx beam sets. An Rx beam set number threshold T1 and/or Tx beam number threshold T2 may be configured. The first T1 Rx beam sets (e.g., only the first T1 Rx beam sets) having the strongest RSRP (e.g., summation of all Tx beams and all Rx antenna groups within the Rx beam set) may be reported. For a (e.g., each) reported Rx beam set, the first T2 beams (e.g., only the first T2 beams) having the strongest RSRP (e.g., summation of all Rx antenna groups for a Tx beam) may be reported along with the respective Tx beam indices for the reported T2 beams. A WTRU may have more than one Rx beam sets. The WTRU may report TRP Tx beam(s) and identifiers of WTRU Rx beam sets associated with the reported TX beam(s).

The report may be based on Rx antenna groups. For example, an Rx antenna group threshold T3 and/or a Tx beam threshold T4 may be configured. The first T3 Rx antenna groups (e.g., only the first T3 Rx antenna groups) having the strongest RSRP (e.g., summation from all Tx beams and all Rx beam sets) may be reported. For a (e.g., each) reported Rx antenna group, the first T4 beams (e.g., only the first T4) having the strongest RSRP (e.g., summation of the Rx beam sets for a Tx beam) may be reported along with the respective Tx beam indices for the reported T4 beams. A WTRU may have more than one Rx antenna groups. The WTRU may report TRP Tx beam(s) and identifiers of WTRU Rx antenna groups associated with the reported Tx beams.

The report may be based on both Rx beam set and Rx antenna group. A RSRP threshold T5 may be configured. The measured RSRP(s) above the RSRP threshold T5 may be reported, along with the details of the corresponding Tx beam(s), Rx beam set(s) and Rx antenna group(s). A threshold T6 for the number of RSRPs may be configured. The largest T6 RSRP values may be reported with their respective Tx beam(s), Rx beam set(s) and/or Rx antenna group(s) corresponding to the largest T6 RSRP values.

The report may be WTRU-specific and/or may be configured based on WTRU capability. For example, a report may be configured based on the number of panels associated with the WTRU, and/or the number of antenna elements in a (e.g., each) panel. For example, if a WTRU is equipped with one panel, the beam reporting may include Rx beam set-based beam reporting. When the number of antenna elements is limited, there may be fewer number of Rx beams formed. The beam reporting may include Rx antenna group-based beam reporting. For example, the beam reporting may not include Rx beam set-based beam reporting.

The reporting may be based on the correlation between the Rx beam sets and Rx antenna groups and/or received power threshold such as RSRP or CSI. The report may include uncorrelated RSRP values. The report may only include uncorrelated RSRP values if the correlation between the Rx beam sets and Rx antenna groups is taken into account for reporting. For example, (Rx beam set 1, Rx antenna group 1) may be spatially correlated with (Rx beam set 2, Rx antenna group 2). Although both of their RSRP values for Tx beam 3 may be higher than a reporting threshold, a RSRP value (e.g., only one RSRP value) may be reported. The reported RSRP value may combine the RSRP values from the correlated (Rx beam set, Rx antenna group), for example, (Rx beam set 1, Rx antenna group 1) and (Rx beam set 2, Rx antenna group 2).

TABLE 7 shows an example of a beam measurement table. The Tx beam index may be represented and/or reported in terms of any or any combination of: CSI-RS resource IDs, a Tx antenna port index, a combination of Tx antenna port index and a time index, reference sequence index, etc.

TABLE 7 an example of a beam measurement table

| | | Tx beam 1 | Tx beam 2 | Tx beam 3 | ... Tx beam n |
|---|---|---|---|---|---|
| Rx beam set 1 | Rx antenna group 1 | RSRP | RSRP | RSRP | RSRP |
| | Rx antenna group 2 | RSRP | RSRP | RSRP | RSRP |
| Rx beam set 2 | Rx antenna group 1 | RSRP | RSRP | RSRP | RSRP |
| | Rx antenna group 2 | RSRP | RSRP | RSRP | RSRP |

Beamforming processes in NR may include beam acquisition, beam adjustment, and/or beam recovery. One or more of the beam acquisition, beam adjustment, and/or beam recovery may be achieved, for example, by DL L1/L2 beam management processes including P-1/P-2/P-3. Group-based DL L1/L2 beam management processes may be performed for beam tracking/refinement within a group or multiple groups, for example, to reduce signal overhead and latency. An example of an L1/L2 beam management process using beam grouping may be described herein.

Figure 29:
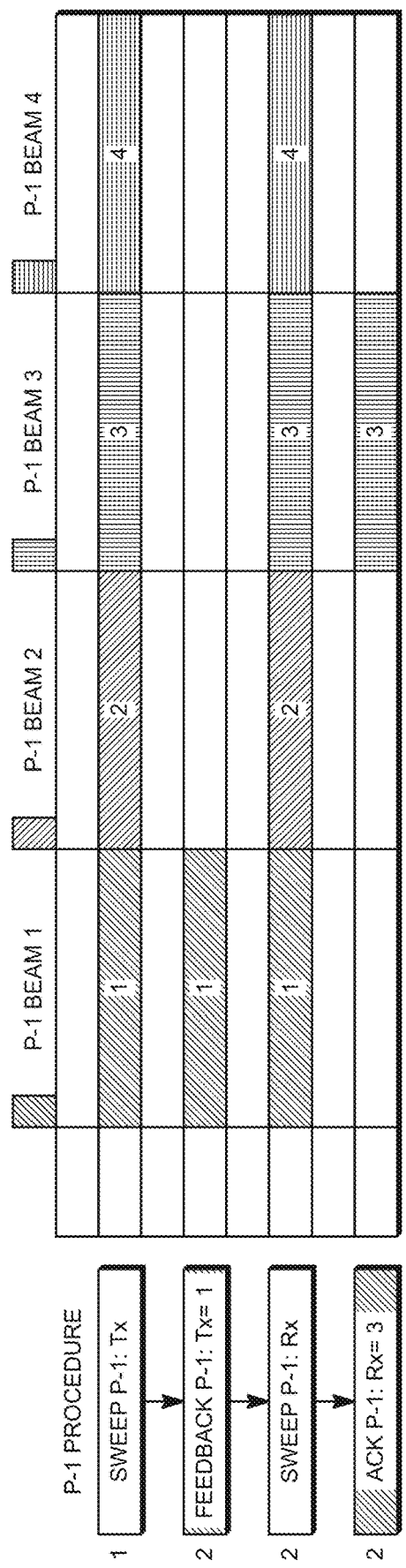
FIG. 29 depicts an example P-1 beam management process (e.g., procedure).

P-1 beam management may be performed. The TRP and WTRU may perform a P-1 beam management process, e.g., to identify coarse transmit and receive beams. In the P-1 transmit process, the TRP may transmit and/or cycle through the TRP's beams (e.g., 1, 2, 3 and 4 illustrated in FIG. 22) with the WTRU antennas set as quasi-omni. The WTRU may feedback the WTRU's best beam to the TRP. During the P-1 process setup, the TRP may indicate that the set of beams used are in the P-1 group. The WTRU may feedback the best-N beams to the TRP with an indication to group the beams together for possible fall-back beam scanning. This allows for WTRU-specific grouping of the beams. This is illustrated in FIG. 29 as beam 1 in procedure items 1 and 2.

Figure 22:
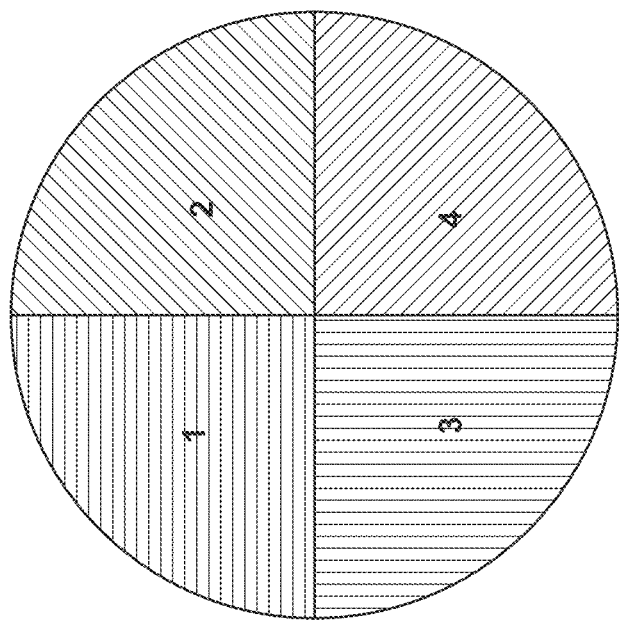
FIG. 22 depicts an example P-1/U-1 beam management process (e.g., procedure), including identifying beam of angular spread 90 degrees.

In the P-1 receive procedure, the TRP may transmit while the WTRU cycles through the WTRU's beams (e.g., 1, 2, 3 and 4 illustrated in FIG. 22). The TRP may transmit using quasi-omni beams. The TRP may use a beam(s) identified during the P-1 transmit procedure if an analog feedback has occurred. This is illustrated in FIG. 29 as Rx beam 3 in procedure items 3 and 4. The WTRU may feedback the Rx beam index to the TRP or initiate a transmission to the RX indicating a successful completion of the P-1 procedure. The feedback may be done through the RACH.

Multi-group based P-2/P-3 beam management may be used. The TRP and WTRU may perform transmit and receive beam refinement using the P-2 and P-3 beam management procedures. The P-2 refinement procedure may be for the transmitter while the P-3 refinement procedure may be for the receiver.

Figure 26:
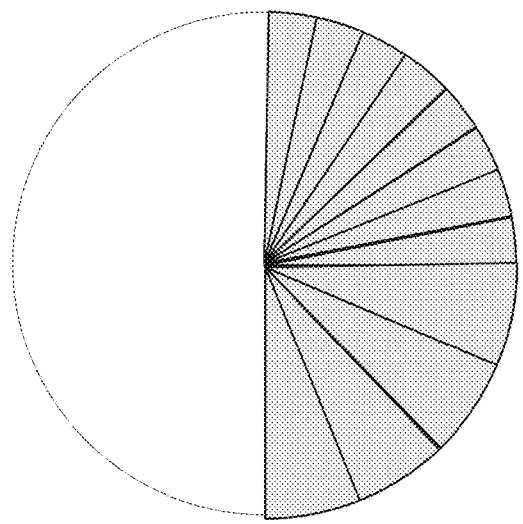
FIG. 26 depicts an example P-2/P-3/U-2/U-3 beam management process (e.g., procedure) group 1 group with unequal beamwidth.
Figure 27:
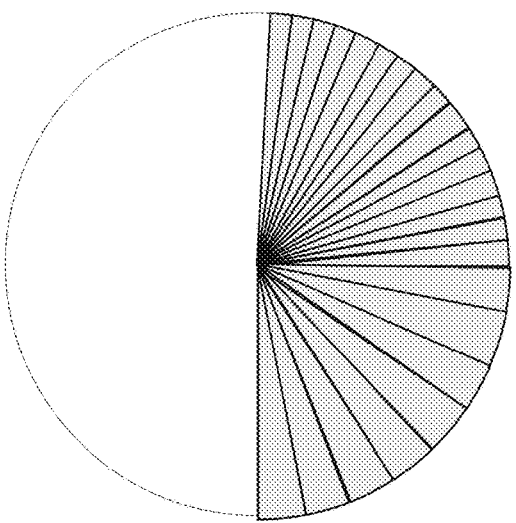
FIG. 27 depicts an example P-2/P-3/U-2/U-3 beam management process (e.g., procedure) group 2 group with unequal beamwidth (and higher resolution than group 1 shown in FIG. 26).
Figure 28:
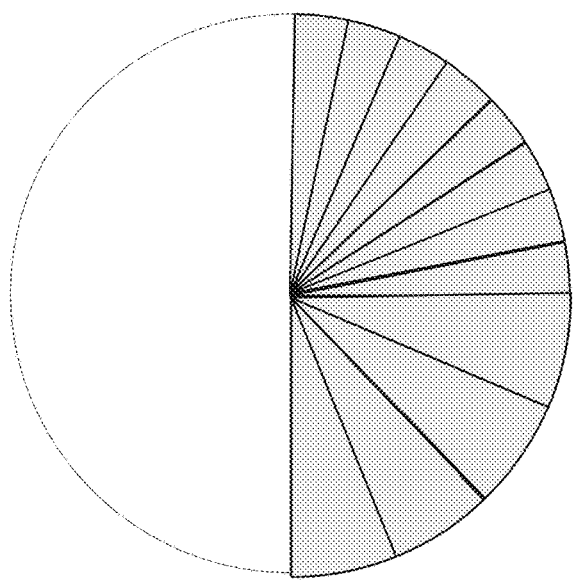
FIG. 28 depicts an example P-2/P-3/U-2/U-3 beam management process (e.g., procedure) group 1/2 group with unequal beamwidth.
Figure 28:
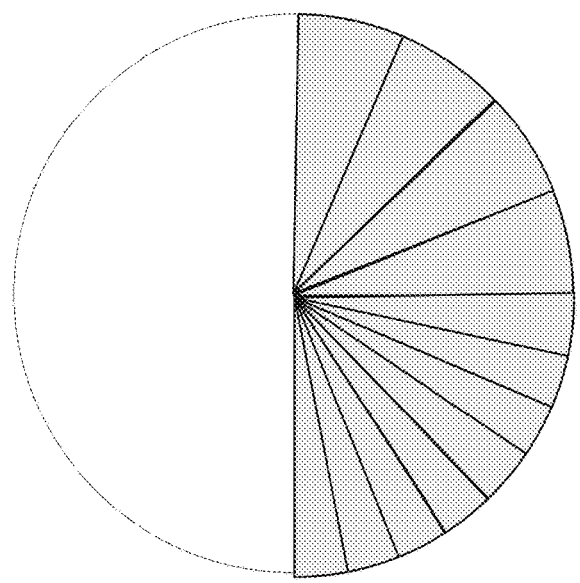

Beam grouping for P-2/P-3 procedure may be performed. The beam refinement procedures may be based on an exhaustive search of some or all possible beams (e.g., FIG. 25). The beam refinement procedures may be based on a series of searches on beams of changing resolution (e.g., FIG. 23, FIG. 24, FIG. 25 for equal bandwidth; FIG. 26 and FIG. 27 for unequal bandwidth). The beam refinement procedures may be based on a group(s) of beams with unequal bandwidth (e.g., FIG. 28).

Figure 23:
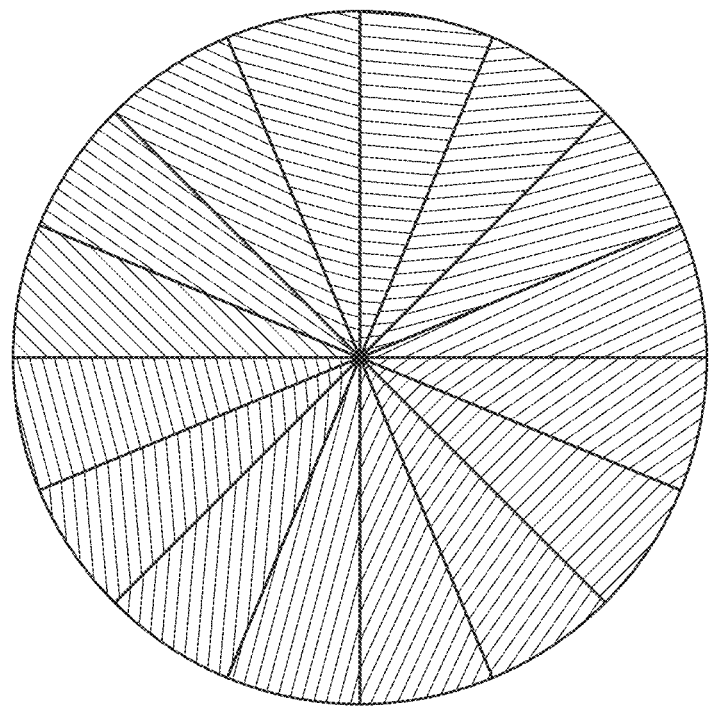
FIG. 23 depicts an example P-2/P-3/U-2/U-3 beam management process (e.g., procedure) group 1 having 4 beams per P-1 beam with angular spread 22.5 degrees.
Figure 25:
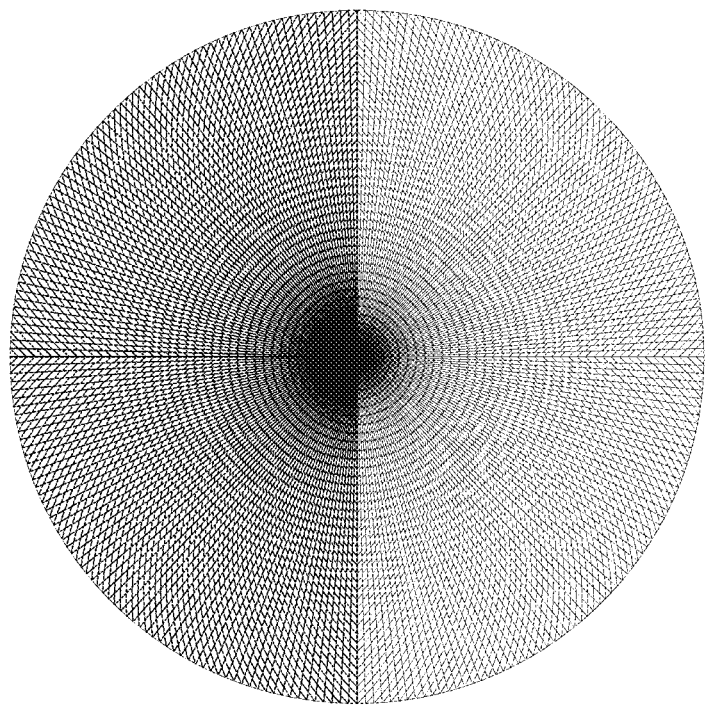
FIG. 25 depicts an example P-2/P-3/U-2/U-3 beam management process (e.g., procedure) group 3 having 4 beams per group 2 beam with angular spread 1.046 degrees.
Figure 24:
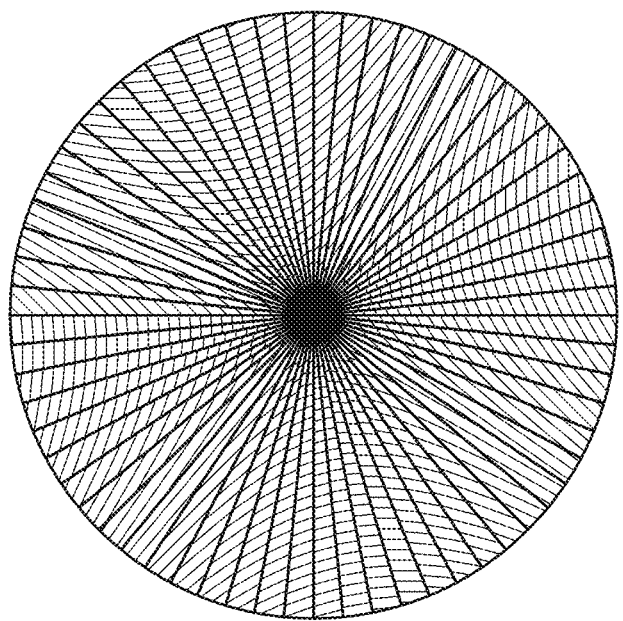
FIG. 24 depicts an example P-2/P-3/U-2/U-3 beam management process (e.g., procedure) group 2 having 4 beams per group 1 beam with angular spread 5.625 degrees.

The TRP and WTRU may perform P-2/P-3 beam refinement on a series of beam groups of increasing resolutions (e.g., 16 beams as shown in FIG. 23, 64 beams as shown in FIG. 24 and finally 256 beams as shown in FIG. 25), for example, rather than performing a beam refinement using an exhaustive search on the beams of the desired beam group (e.g., 256 beams as shown in FIG. 25). In this example (e.g., simplified), if we were to perform a permutation of all possible beams, in the exhaustive search scenario and assuming that the P-1 procedure has identified the P-1 beam with 64 beams for refinement, we would have 64×64 beam pairs to search through. In the scenario with multiple resolutions, we may have 3×16×16 beam pairs to search through. This may reduce time used (e.g., an overall time needed) for beam search procedure and/or may increase beam refinement efficiency.

The TRP and the WTRU may perform P-2/P-3 beam refinement on a series of beam of uneven or varying resolution(s). In an example, this may occur if additional information such as the location of the WTRU may be available. In this case, the beam group may have a refined beam(s) around an angular location pointing toward a dense WTRU location(s) and/or larger beams elsewhere. This is illustrated in FIG. 26 and FIG. 27. In an example, this may occur in a scenario where the TRP may point to traffic of varying types. A pattern such as one shown in FIG. 26 and FIG. 27 may occur if a first quadrant of the TRP points to a hotspot while the other quadrants point to a road with WTRUs of higher Doppler present. In one example, this may occur in scenarios where the TRP may desire to sweep a beam space (e.g., the entire beam-space) with beams of varying beamwidth as show in FIG. 28.

P-2/P-3 procedure for group-based beam may be performed. For P-2/P-3 Group 1, the TRP may initiate a P-2 transmit beam refinement procedure by sending a measurement signal on a beam (e.g., each of the beams) in the group (e.g., corresponding to sub-beams with beamwidth of 22.5 degrees as illustrated in FIG. 23) with the WTRU setting the WTRU's receive beam to the beam identified in the P-1 beam management procedure (e.g., beam 3). The measurement to decide the best beam may be based on one or more of the beam-based synchronization signals, beam measurement signals, or WTRU-specific beam-formed measurement signals.

Figure 30A:
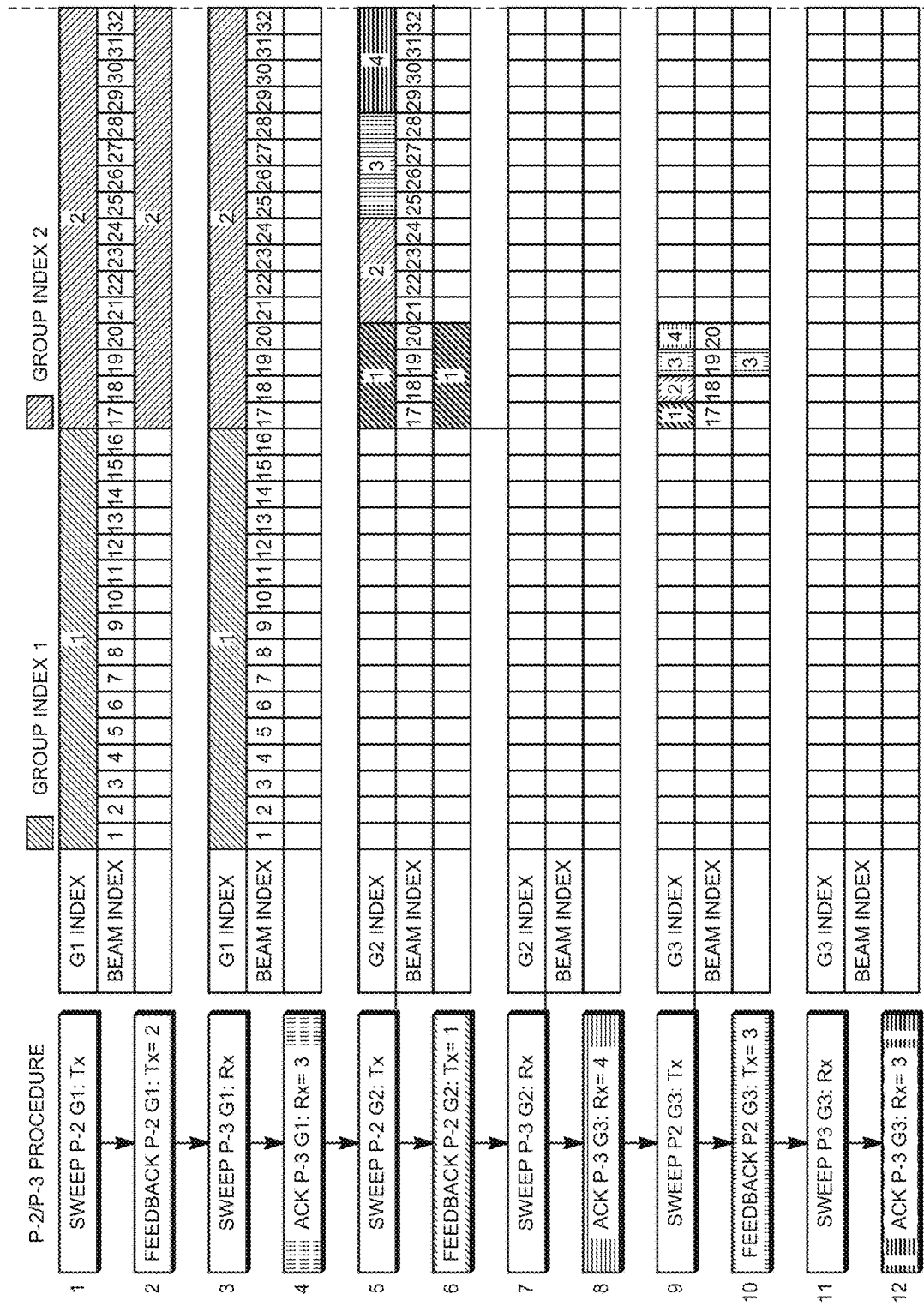
FIGS. 30A-30B depict an example group based L1/L2 beam management process (e.g., procedure) for P-2/P-3/U-2/U-3 beam refinement.
Figure 30B:
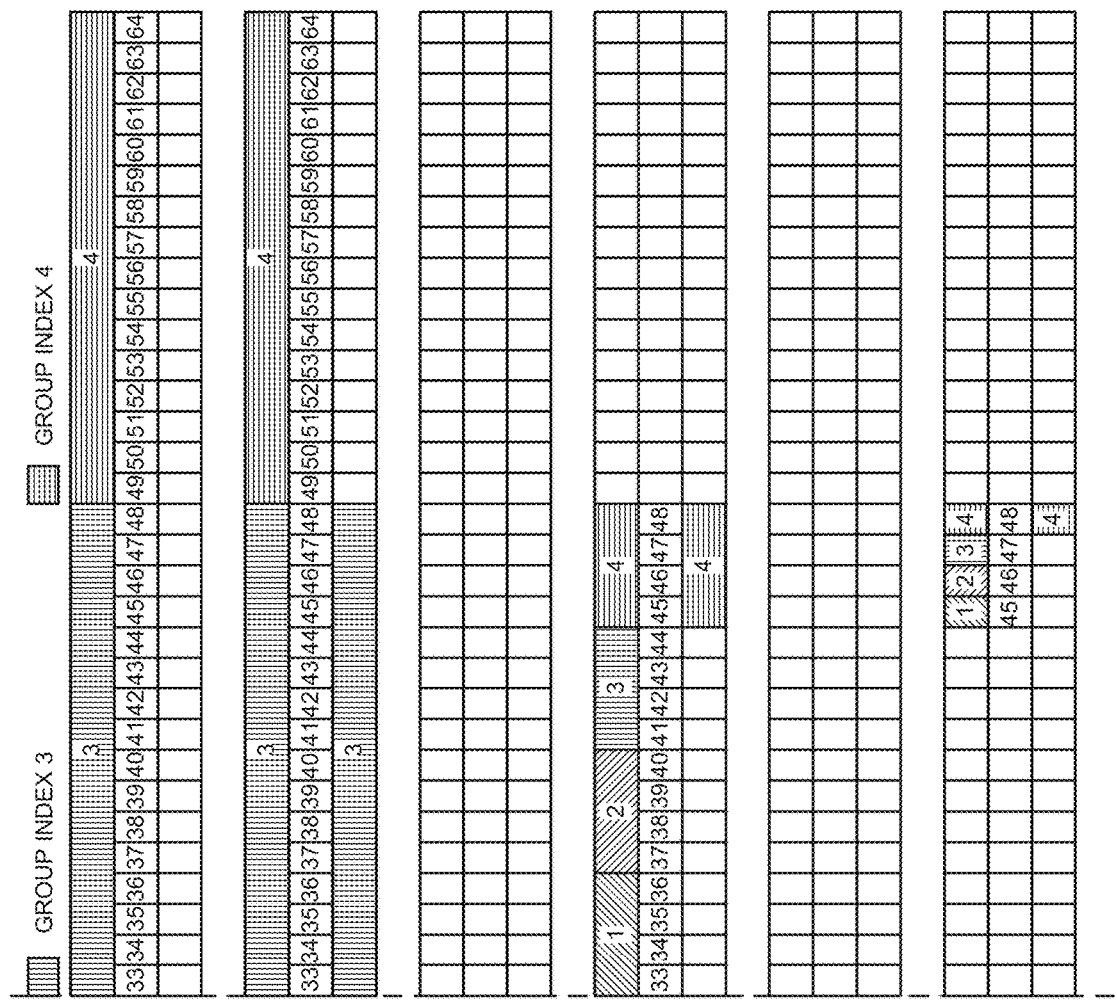

The WTRU may feedback the best Tx beam for beam group 1 (e.g., Tx beam P-2: G1: Tx=2) as shown in FIG. 30A-30B, procedure items 1 and 2) and/or request for a P-3 receiver beam refinement procedure. Tx beam P-2: G1: Tx=y may be the beam y in group 1 estimated from the P-2 procedure. The WTRU may feedback the best N Tx beams for beam group 1 and a corresponding group number to allow for beam group resolution fall-back, for example, in the case of a loss of the link. In beam resolution fall-back, the WTRU/TRP may request for beam tracking/sweeping within a specified group. The TRP may send a measurement signal with the Tx beam set to Tx beam 1, 2 for four measurement durations and the WTRU may cycle through a (e.g., each) beam within the resolution. The WTRU may feedback the best Rx beam, for example, (P-3 G1: Rx=3) as shown in FIG. 30A-30B, procedure items 3 and 4.

For P-2/P3 group 2 and group 3, the TRP and the WTRU may perform the second and third P-2/P-3 beam refinement procedure in which beam groups of increasing resolution are used. The TRP and the WTRU may do this by changing beam groups and/or selecting sub-groups based on the feedback from a previous refinement group. In the example in FIG. 30A-30B, in the next refinement group, the refinement may correspond to the beam group with sub-beams of beamwidth of 5.625 degrees as illustrated in FIG. 24, with the WTRU setting the WTRU's receive beam to the beam identified in the first group refinement (P-3 G1: Rx=3). The TRP and the WTRU may identify the best Tx and Rx beams for beam group group 2, for example, (P-2 G2: Tx=1 as shown in FIG. 29, procedure items 5 and 6 and Rx beam P-3 G2: Rx=4) as shown in FIG. 29, procedure items 7 and 8.

Further refinement may occur at the next group of resolution in which the refinement may correspond to the beam group with sub-beams beamwidth of beamwidth 1.06 degrees as illustrated in FIG. 25, with the WTRU setting the WTRU's receive beam to the beam identified in the first group refinement (Rx beam P-3 G2: Rx=4). The TRP and the WTRU may identify the best Tx and Rx beams for group 3, Tx beam (e.g., Tx beam P2 G3: Tx=3 equivalent to beam 19 of the 64 beams in the P-1 beam as shown in FIG. 29, procedure items 9 and 10) and Rx beam (e.g., Rx beam P-3 G3: Rx=3 equivalent to beam 48 of the 64 beams in the Rx P-1 beam as shown FIG. 29, procedure items 11 and 12). The beam(s) may be an antenna waveform vector.

This may allow for a more efficient beam sweep than an exhaustive search and/or may allow for easy beam fall back, for example, during periods of a link loss. This procedure may be reversed for UL beam management with the WTRU as the initiator and the TRP as the responding element. In this case, the procedures P-1, P-2 and P-3 may be replaced by the corresponding uplink procedures U-1, U-2 and U-3.

In the event of a loss in the link or transmit receive pairs, the TRP and/or the WTRU may fall back to a beam group with a larger resolution for a quick recovery. This may allow for a more robust link and/or faster link recovery as the refinement procedure (P-2, P-3, U-2, or U-3) may start from the desired beam group as described herein rather than performing an exhaustive search over all beams.

Waveform selection for beam management may be performed. Mechanisms may be provided for waveform selection for beam management. A transmission may use one of several types of waveforms including CP-OFDM, CP DFT-sOFDM, or UW/GI/ZT DFTsOFDM. A waveform type may be associated with a beam group to a particular WTRU type. A WTRU may support a beam's full or partial reciprocity and/or may support specific waveform capabilities. When a TRP queries a WTRU for inclusion in a beam group, the TRP may receive the WTRU's capabilities response(s). If the WTRU supports beam reciprocity, the TRP may use the beam reciprocity to enable a particular waveform type at the TRP and/or instruct the WTRU to use the same type of waveform(s).

If a beam group is in a cell edge region, it may be desirable for the waveform to be set to DFT-s-OFDM. The TRP may be configured to receive a DFT-s-OFDM waveform. Some or all of the WTRU's allocated to a beam group configured for DFT-s-OFDM reception may use a DFT-s-OFDM waveform. For example, all of the WTRU's allocated to a beam group may be configured with DFT-s-OFDM. Whether a CP-OFDM, DFT-s-OFDM, or other type of waveform is used, it may be assumed that the configuration information from the WTRU may be received irrespective of the waveform type in use.

Although the solutions described herein consider LTE, LTE-A, New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:
1. A wireless transmit/receive unit (WTRU), comprising:
a processor configured to:
receive a channel state information reference signal (CSI-RS) configuration message, wherein the CSI-RS configuration message indicates a group associated with a first level of beam reporting that uses a first cycle, and wherein the first level of beam reporting differs from a second level of beam reporting that uses a second cycle;
send a first report in accordance with the first cycle, wherein the first report is based on measurement information associated with the indicated group, wherein the first report comprises a reference signal received power (RSRP) for a representative beam, and the representative beam is one of a plurality of beams in the indicated group; and
send a second report in accordance with the second cycle, wherein the second report is based on measurement information associated with individual beams, wherein the second report comprises a differential RSRP associated with a RSRP for a first beam of the individual beams and a reference RSRP associated with a second beam of the individual beams.

2. The WTRU of claim 1, wherein the reference RSRP associated with the second beam has a largest measurement value compared to RSRPs of the individual beams.

3. The WTRU of claim 1, wherein the RSRP of the representative beam has a largest measurement value compared to RSRPs of other beams in the indicated group.

4. The WTRU of claim 1, wherein the processor is further configured to determine the RSRP for the representative beam based on a beam reference signal, wherein the beam reference signal comprises a channel state information reference signal (CSI-RS) or a synchronization signal (SS)/physical broadcast channel (PBCH) block.

5. The WTRU of claim 1, wherein the first report comprises a channel state information (CSI) resource index associated with the representative beam.

6. The WTRU of claim 1, wherein the CSI-RS configuration message indicates the first cycle and the second cycle.

7. The WTRU of claim 1, wherein the individual beams are included in the plurality of beams in the indicated group.

8. The WTRU of claim 1, wherein the individual beams include one or more beams different than the plurality of beams in the indicated group.

9. A method, comprising:
receiving a channel state information reference signal (CSI-RS) configuration message, wherein the CSI-RS configuration message indicates a group associated with a first level of beam reporting that uses a first cycle, and wherein the first level of beam reporting differs from a second level of beam reporting that uses a second cycle;
sending a first report in accordance with the first cycle, wherein the first report is based on measurement information associated with the indicated group, wherein the first report comprises a reference signal received power (RSRP) for a representative beam, and the representative beam is one of a plurality of beams in the indicated group; and
sending a second report in accordance with the second cycle, wherein the second report is based on measurement information associated with individual beams, wherein the second report comprises a differential RSRP associated with a RSRP for a first beam of the individual beams and a reference RSRP associated with a second beam of the individual beams.

10. The method of claim 9, wherein the reference RSRP associated with the second beam has a largest measurement value compared to RSRPs of the individual beams.

11. The method of claim 9, wherein the RSRP of the representative beam has a largest measurement value compared to RSRPs of other beams in the indicated group.

12. The method of claim 9, further comprising determining the RSRP for the representative beam based on a beam reference signal, wherein the beam reference signal comprises a channel state information reference signal (CSI-RS) or a synchronization signal (SS)/physical broadcast channel (PBCH) block.

13. The method of claim 9, wherein the first report comprises a channel state information (CSI) resource index associated with the representative beam.

14. The method of claim 9, wherein the CSI-RS configuration message indicates the first cycle and the second cycle.

15. The method of claim 9, wherein the individual beams are included in the plurality of beams in the indicated group.

16. The method of claim 9, wherein the individual beams include one or more beams different than the plurality of beams in the indicated group.

* * * * *